United States Patent
Lucas

(10) Patent No.: US 9,551,222 B2
(45) Date of Patent: Jan. 24, 2017

(54) FREEWHEEL HYDRAULIC MOTOR

(71) Applicant: Eaton Corporation, Cleveland, OH (US)

(72) Inventor: Jay Paul Lucas, Plymouth, MN (US)

(73) Assignee: Eaton Corporation, Cleveland, OH (US)

( * ) Notice: Subject to any disclaimer, the term of this patent is extended or adjusted under 35 U.S.C. 154(b) by 440 days.

(21) Appl. No.: 13/944,465

(22) Filed: Jul. 17, 2013

(65) Prior Publication Data

US 2014/0023544 A1     Jan. 23, 2014

Related U.S. Application Data

(60) Provisional application No. 61/672,984, filed on Jul. 18, 2012.

(51) Int. Cl.
*F01C 21/00*     (2006.01)
*F16D 55/38*     (2006.01)
(Continued)

(52) U.S. Cl.
CPC ............ *F01C 21/008* (2013.01); *F03C 2/08* (2013.01); *F04C 14/06* (2013.01);
(Continued)

(58) Field of Classification Search
CPC ..... F01C 21/008; F04C 14/06; F04C 15/0084; F16D 55/30; F16D 55/32; F16D 55/38; F16D 55/40; F16D 2121/12; F16D 2121/14; F16D 2127/04; F16D 2127/06; F03C 2/08
(Continued)

(56) References Cited

U.S. PATENT DOCUMENTS 3,619,085 A * 11/1971 Nuss ................... F04C 15/0061
                                                         417/223
4,187,931 A    2/1980 Balzer
(Continued)

FOREIGN PATENT DOCUMENTS

EP     0 085 906 A2    8/1983
EP     1 072 791 A2    1/2001
(Continued)

OTHER PUBLICATIONS

International Search Report and Written Opinion for PST/US2013/050808 mailed Jun. 17, 2014.

*Primary Examiner* — Logan Kraft
(74) *Attorney, Agent, or Firm* — Merchant & Gould P.C.

(57) ABSTRACT

The present disclosure relates to a hydraulic drive having a stationary housing. The hydraulic drive also has a drive shaft that extends through the stationary housing. Furthermore, the hydraulic drive has a hydraulic motor for rotating the drive shaft relative to the stationary housing. Additionally, the hydraulic drive includes a driven hub adapted to be connected to a rotatable driven element. The hydraulic drive also has a coupling/decoupling arrangement that allows the hydraulic drive to be operated in an engaged mode where the drive shaft is coupled to the driven hub in a direct drive arrangement and a disengaged mode where the drive shaft is decoupled from the driven hub. When the hydraulic drive is operated in the engaged mode torque from the drive shaft is transferred to the driven hub causing the driven hub to rotate relative to the stationary housing. When the hydraulic drive is operated in the disengaged mode the driven hub can free wheel relative to the drive shaft.

34 Claims, 18 Drawing Sheets

(51) Int. Cl.
*F16D 55/50* (2006.01)
*F03C 2/08* (2006.01)
*F04C 14/06* (2006.01)
*F04C 15/00* (2006.01)
*F16D 121/12* (2012.01)
*F16D 127/06* (2012.01)
*F16D 127/04* (2012.01)
*F16D 121/14* (2012.01)

(52) U.S. Cl.
CPC .......... *F04C 15/0084* (2013.01); *F16D 55/38* (2013.01); *F16D 55/50* (2013.01); *F16D 2121/12* (2013.01); *F16D 2121/14* (2013.01); *F16D 2127/04* (2013.01); *F16D 2127/06* (2013.01)

(58) Field of Classification Search
USPC .......................................................... 60/442
See application file for complete search history.

(56) References Cited

U.S. PATENT DOCUMENTS

| | | | |
|---|---|---|---|
| 4,613,292 A * | 9/1986 | Bernstrom | F04C 14/06 180/242 |
| 4,645,039 A | 2/1987 | Lewis et al. | |
| 4,667,527 A | 5/1987 | Ehrlinger et al. | |
| 4,981,423 A | 1/1991 | Bissonnette | |
| 6,132,194 A | 10/2000 | Wenker et al. | |
| 6,253,882 B1 | 7/2001 | White | |
| 6,321,882 B1 | 11/2001 | Heckel et al. | |
| 6,357,558 B1 * | 3/2002 | Case | F03C 1/0403 188/170 |
| 6,743,002 B1 | 6/2004 | Millar et al. | |
| 6,772,863 B2 | 8/2004 | Jessen et al. | |
| 7,014,028 B2 | 3/2006 | Buck et al. | |
| 7,287,969 B2 * | 10/2007 | Fugle | F03C 2/08 418/61.3 |
| 8,157,552 B2 * | 4/2012 | Kurokawa | F04C 29/0042 188/170 |
| 2004/0060779 A1 | 4/2004 | Kreger | |
| 2008/0307784 A1 | 12/2008 | White, Jr. | |
| 2010/0178188 A1 | 7/2010 | White, Jr. | |
| 2011/0017059 A1 | 1/2011 | Heren et al. | |

FOREIGN PATENT DOCUMENTS

| | | |
|---|---|---|
| GB | 1 441 173 | 6/1976 |
| WO | WO 01/61150 A1 | 8/2001 |
| WO | WO 2007/083232 A2 | 7/2007 |

\* cited by examiner

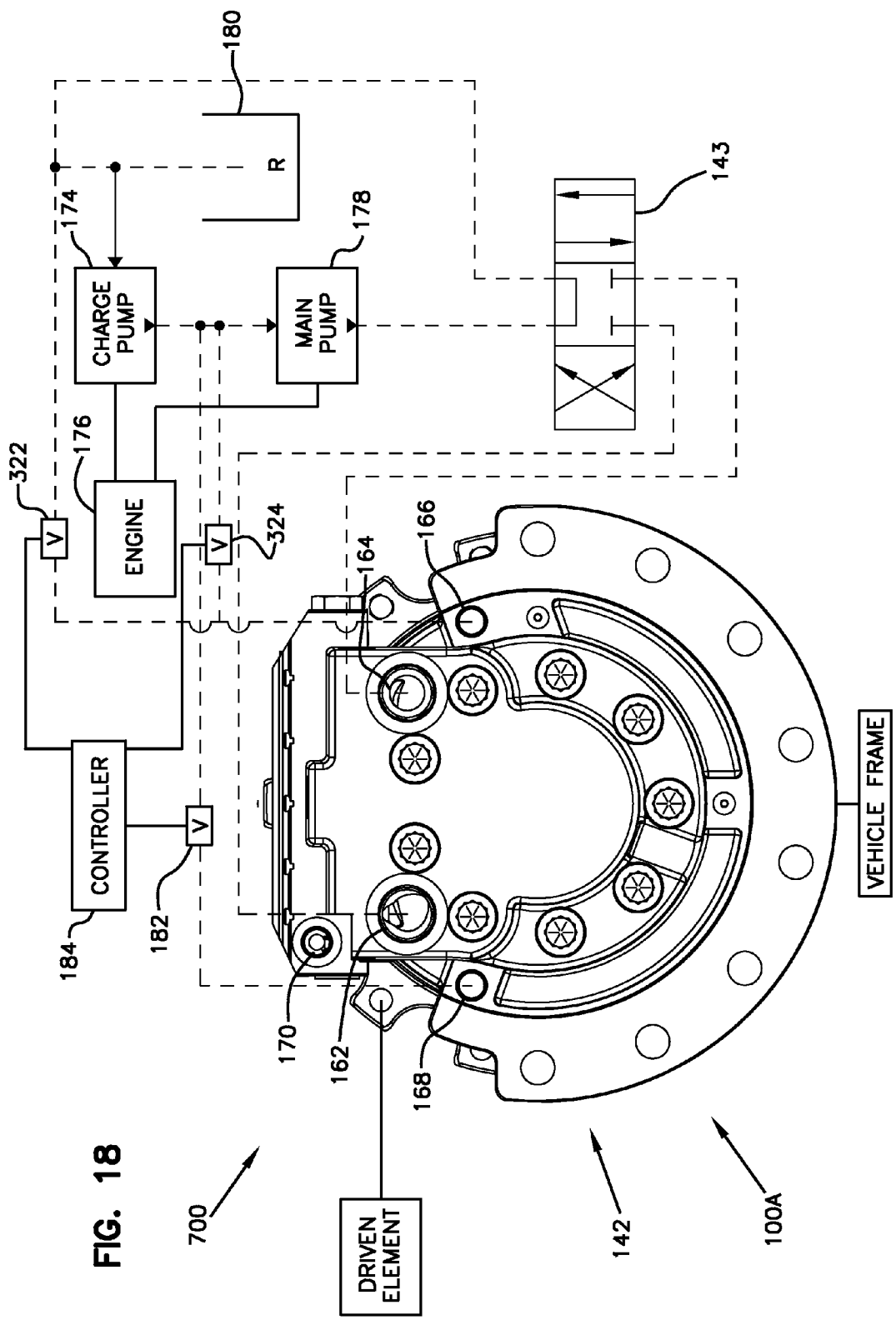

FREEWHEEL HYDRAULIC MOTOR

CROSS REFERENCE TO RELATED APPLICATION

The present application claims priority to U.S. Provisional Patent Application Ser. No. 61/672,984, entitled "Freewheel Hydraulic Motor" and filed on Jul. 18, 2012, the disclosure of which is hereby incorporated by reference in its entirety.

TECHNICAL FIELD

The disclosure is directed to hydraulic motor and braking assemblies.

BACKGROUND

In many propel-vehicle applications that include hydraulic motors, it is desirable for the motor to have a parking brake or parking lock. Typically, brake packages which are used with hydraulic motors, and especially those brake packages used as integral brake packages with low-speed, high-torque (LSHT) gerotor motors, are of the "spring-applied, pressure-released" (SAPR) type as is now well known to those skilled in the art. In a typical SAPR braking assembly, the braking members (e.g., friction discs, etc.) are biased toward braking engagement by a spring arrangement, and are moved toward a brake-disengaged condition by hydraulic pressure, which may be internal case pressure, external "pilot" pressure from a system charge pump, or any other suitable source of pressure.

In most embodiments, a SAPR braking assembly utilizes a piston to apply or release a brake. The piston transfers force from a spring to a brake pack (e.g., a plurality of brake pads) to engage the brake assembly. The piston utilized to apply or release the brake is generally enclosed between a stationary housing and a rotating shaft, or between two stationary housings (see, e.g., U.S. Pat. No. 6,743,002). The inner and outer diameters of the piston are usually sealed by one or more seals, which may be dynamic or static. For instance, a seal on an outer diameter of the piston may be a static seal, while the seal on an inner diameter of the piston may be a dynamic seal or a static seal, depending on whether the piston is seated on a rotating shaft or a stationary housing. Due to the dimensional variations inherent in dynamic seals, these types of seals can be difficult and costly to design, and can wear out more quickly than static seals. Because of these design and wear constraints, dynamic seals are generally only suitable for small rotating shaft diameters. As shaft diameter increases, the pressure velocity (PV) factor for the seal increases, thus limiting the seal life and the size of a piston inner diameter.

SUMMARY

In the propel-vehicle applications discussed above that include hydraulic motors, it may be desirable to disengage the hydraulic portion of the motor from the driven hub to allow the driven hub to free-wheel (i.e., to be non-driven). This may allow the vehicle to be towed (e.g., in case of failure) or otherwise moved without resistance from the hydraulic motor. The ability to free-wheel is also applicable to part-time assist applications. One example of a part-time assist application is where a wheel is driven during four wheel applications, but free wheels during two wheel drive application. Free-wheeling may increase the life of the moving motor parts by reducing friction between these parts when the vehicle is being towed or otherwise moved by an external force. Various aspects of the present disclosure relate to hydraulic drive configurations that allow the hydraulic drive to be easily operated in either a driven mode or a free-wheel mode.

One aspect of the present disclosure relates to a hydraulic drive including a stationary housing, a drive shaft that extends through the stationary housing, a hydraulic motor for rotating the drive relative to the stationary housing, and a driven hub adapted to be connected to a rotatable driven element such as a wheel, tire, gear, track, drum, or other structure. The hydraulic drive also includes a coupling/decoupling arrangement that allows the hydraulic drive to be operated in an engaged mode where the drive shaft is coupled to the driven hub in a direct drive arrangement and a disengaged mode where the drive shaft is decoupled from the driven hub. When the hydraulic drive is operated in the engaged mode, torque from the drive shaft is transferred to the driven hub causing the driven hub to rotate relative to the stationary housing. When the hydraulic drive is operated in the disengaged mode, the driven hub can free-wheel relative to the drive shaft. In one example embodiment, the hydraulic motor is a gerotor-type hydraulic motor.

In certain embodiments, the coupling/decoupling arrangement is configured such that the hydraulic drive can be mechanically actuated between the engaged and disengaged modes without requiring the use of hydraulic power. Alternatively, in other embodiments, the coupling/decoupling arrangement is configured such that the hydraulic drive can be hydraulically actuated between the engaged and disengaged modes. In still other embodiments, the coupling/decoupling arrangement is configured such that the hydraulic drive can be mechanically actuated between the engaged and disengaged modes without requiring the use of hydraulic power, and is also configured such that the hydraulic drive can be hydraulically actuated between the engaged and disengaged modes.

In certain embodiments of the present disclosure, the coupling/decoupling arrangement can include a coupler moveable between an engaged position and a disengaged position. When the coupler is in the engaged position, the coupler is adapted to transfer torque between the drive shaft and the driven hub such that the hydraulic drive is operable in the engaged mode. When the coupler is in the disengaged position, the coupler is adapted to not transfer torque between the drive shaft and the driven hub such that the hydraulic drive is operable in the disengaged mode. In certain embodiments, the coupler can be coupled to the drive shaft by a splined connection and can also be connected to the driven hub by a splined connection.

In certain embodiments, a bearing is provided between the driven hub and the stationary housing for allowing the driven hub to rotate relative to the stationary housing about an axis of rotation defined by the bearing. The hydraulic drive can also include a brake having a brake pack for providing for providing a braking action between the stationary housing and the driven hub. A spring actuated piston can be used to apply a braking force to the brake pack. The brake can be released by applying hydraulic pressure to the piston to generate a brake release force that opposes the braking force. In certain embodiments, the piston can be carried with the driven hub and the coupler when the hydraulic drive is operated in the engaged mode such that the driven hub, the coupler, and the piston all rotate in unison about the axis of rotation defined by the bearing.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 18 is a combined schematic illustration showing the hydraulic drive of FIG. 10 incorporated into a vehicle.

DETAILED DESCRIPTION

Figure 1:
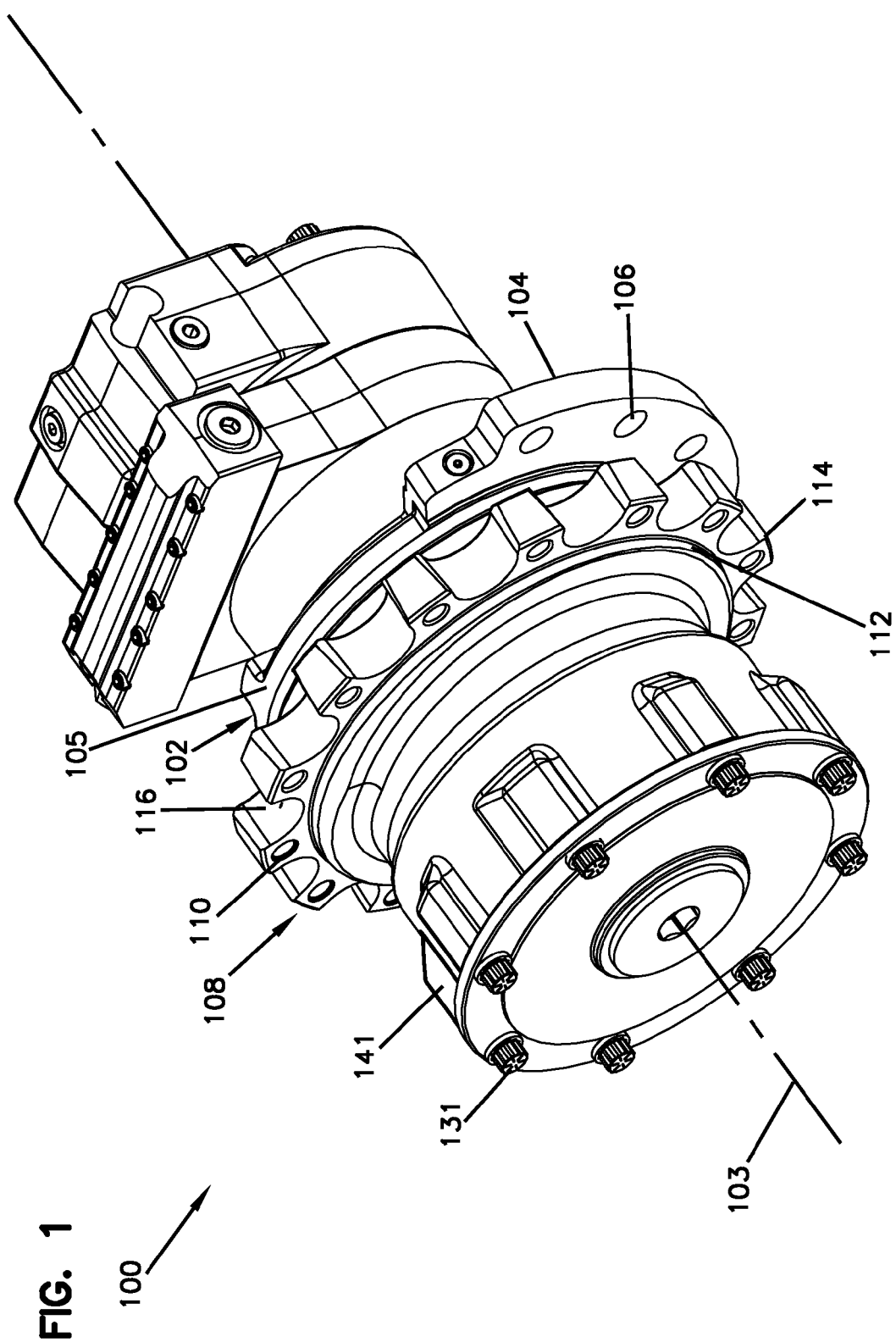
FIG. 1 is an isometric view of a combined hydraulic motor and brake having exemplary features in accordance with the principles of the present disclosure.

Reference will now be made in detail to the exemplary aspects of the present disclosure that are illustrated in the accompanying drawings. Wherever possible, the same reference numbers will be used throughout the drawings to refer to the same or like structure.

Embodiments of the disclosure described above may be particularly useful in propel vehicle applications, such as compact track loaders, sprayers, combines or other low speed, high torque vehicles. One or more combined hydraulic motor and brake assemblies may be coupled to a track, a wheel or a sprocket/gear driving a track. Hydraulic motor and brake assemblies in accordance with the principles of the present disclosure can also be used to drive chipping/grinding drums, chipping/grinding wheels or discs, drill heads, or other rotatable structures.

Generally disclosed is a motor and brake assembly. The assembly may include a hydraulic motor that drives rotation of a driven hub to which a driven element such as a wheel, sprocket drum or other structure can be mounted/connected. Torque from the hydraulic motor can be transferred to the driven hub by a shaft assembly including a drive shaft and a coupler. The coupler is configured to couple the drive shaft to the driven hub. The motor and brake assembly can also include a brake piston carried with the coupler and the driven hub such that these components rotate together as a unit. An outer diameter of the brake piston may be frictionally engaged with the driven hub and an inner diameter of the brake piston may be frictionally engaged with the shaft assembly (e.g., the coupler or the drive shaft). The brake piston may include one or more seals which are not exposed to relative rotational movement between the parts being sealed as the driven hub is rotated. For example, an outer seal can be provided between the brake piston and the driven hub and an inner seal can be provided between the brake piston and the drive shaft or the coupler. Since the brake piston, the driven hub, the drive shaft and the coupler all rotate as a unit, there is no relative movement between the seals and the components being sealed by the seals (i.e., the seals remain static/stationary with respect to the components being sealed). This reduces wear on the seals and enhances piston and overall assembly size flexibility. A brake pack is used to provide a braking action for resisting relative rotation between the driven hub and a stationary housing of the assembly. The stationary housing can be adapted to be coupled to a structure such as a vehicle frame. The brake pack can include first brake pads carried with the driven hub and second brake pads secured to the stationary housing. The first and second brake pads can be interleaved with one another. To apply the brake, the piston compresses the first and second brake pads together such that friction between the pads resists relative rotation between the driven hub and the stationary housing. A spring can be used to bias the brake piston against the brake pack thereby providing a braking force that causes application of the brake. A brake release mechanism is configured to move the brake piston away from the brake pack to release the braking force. The brake release mechanism can be hydraulically actuated.

Figure 2:
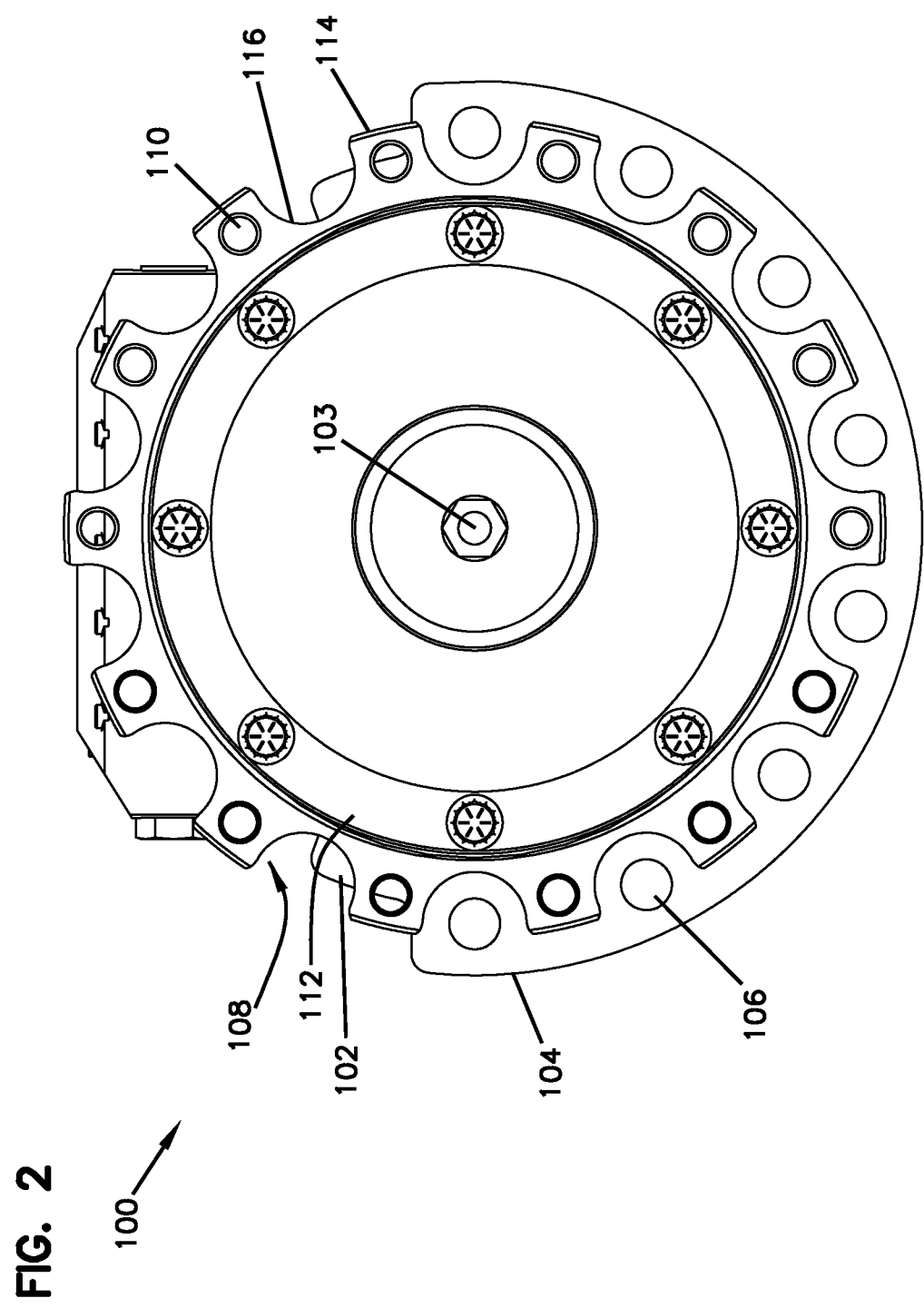
FIG. 2 is a front view of the combined hydraulic motor and brake of FIG. 1.

Referring to FIGS. 1-9, a combined hydraulic motor and brake assembly 100 may generally include a first mounting assembly for coupling the combined hydraulic motor and brake assembly 100 to a non-driven/stationary element (e.g., a portion of a vehicle frame). For the purposes of this disclosure, the first mounting assembly may include a stationary housing 102. The stationary housing 102 can also be referred to as an inner housing. The stationary housing 102 includes a mounting flange 104 projecting radially outwardly from a main body 105 of the stationary housing 102. The mounting flange 104 defines a plurality of first fastener openings 106 for receiving first fasteners (e.g., bolts not shown) used to secure the stationary housing 102 to a non-driven/stationary element. The mounting flange 104 is generally semi-circular in shape, but other shapes could be used as well (e.g., full rings or other shapes). The combined hydraulic motor and brake assembly 100 may also include a second mounting assembly for coupling the combined hydraulic motor and brake assembly 100 to a driven/non-stationary element (e.g., a wheel, sprocket or other structure intended to be rotated). For the purposes of this disclosure, first mounting assembly may include a driven hub 108. The driven hub 108 can also be referred to as an outer housing or a rotating housing. The driven hub 108 may be mounted at least partially over the stationary housing 102. The driven hub 108 includes a plurality of second fastener openings 110 for receiving second fasteners (e.g., bolts not shown) used to secure the driven hub 108 to a driven element. The driven hub 108 includes a main body 112 and a plurality of tabs 114 that project radially outwardly from the main body 112. The tabs 114 are circumferentially spaced around a perimeter of the main body 112 of the driven hub 108. The second fastener openings 110 may be defined through the tabs 114. The tabs 114 are separated by pockets 116, and at least some of the pockets 116 may align with the first fastener openings 106 to facilitate accessing the first fastener openings 106. FIG. 2 illustrates the pockets 116 aligned with the first fastener openings 106. In other embodiments, configurations other than tabs (e.g., solid flanges or other structures) can be used to connect the driven hub to a driven element.

Figure 6:
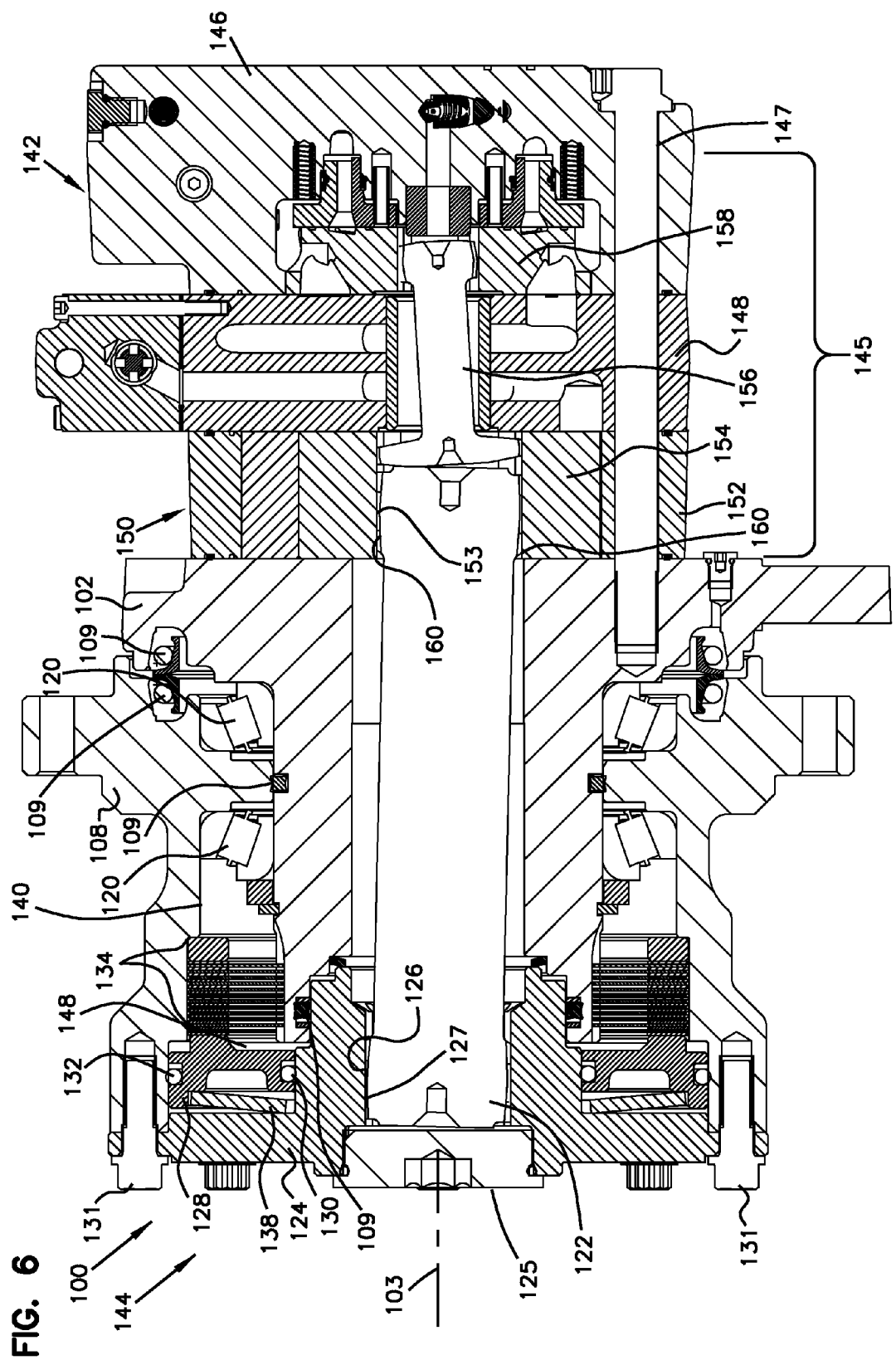
FIG. 6 is a cross-sectional view of a combined hydraulic motor and brake illustrating in further detail the motor portion of the hydraulic motor and brake of FIG. 1.

Referring to FIG. 6, a cross-sectional view of the combined hydraulic motor brake assembly 100 is shown. As discussed above, the combined hydraulic motor and brake assembly 100 includes a stationary housing 102 and a driven hub 108. A sealing arrangement 109 (e.g., duo cone seals, X-ring seals, O-ring seals, etc.) may be disposed between stationary housing 102 and the driven hub 108 at various intervals. Stationary housing 102 may further define a shaft passage 118. One or more bearings 120 may be positioned between the driven hub 108 and the stationary housing 102 to allow the driven hub 108 to rotate relative to the stationary housing 102 about an axis of rotation 103 that extends through the shaft passage 118. The axis of rotation 103 is defined by the bearings 120. Any suitable bearing may be utilized. In some embodiments, the bearing 120 is a thrust bearing. The combined hydraulic motor and brake assembly 100 further includes a main drive shaft 122 that extends through the shaft passage 118 of the stationary housing 102.

The combined hydraulic motor and brake assembly 100 may further include a coupler 124 for coupling the main drive shaft 122 to the driven hub 108. The coupler 124 and the driven hub 108 rotate as a unit about the axis of rotation 103 when driven by the drive shaft 122. The coupler 124 is coupled to the driven hub 108 by a plurality of fasteners 131 (e.g., bolts, cams, etc.) that are circumferentially spaced around the axis of rotation 103 along a perimeter of the coupler 124. The main drive shaft 122 is coupled to the coupler 124 by a splined mechanical interface (e.g., a crown spline interface). Specifically, an end of drive shaft 122 includes splines 126 that engage with splines 127 of coupler 124. Torque may be transferred from main drive shaft 122 to coupler 124 and the driven hub 108 as main drive shaft 122 is driven (e.g., by a hydraulic motor). An end plug 125 (see FIG. 6) mounts to the coupler 124 and encloses the end of the shaft passage 118. The end plug 125 can be threaded into the coupler 124 and can oppose an end of the drive shaft 122 in the shaft passage 118.

FIG. 6 shows a motor portion (e.g., hydraulic motor 142) and a brake portion (e.g., brake assembly 144) of the hydraulic motor and brake of FIG. 1. The hydraulic motor 142 is configured to rotate the main drive shaft 122 relative to the stationary housing 102. In the depicted embodiment, the motor is rear-piloted, and includes a motor housing assembly 145 back-mounted to the stationary housing 102 via fasteners 147. In this way, the stationary housing 102 is fixed or stationary relative to the motor housing assembly 145. Other types of motor piloting and motor mounting configurations can be used as well.

The hydraulic motor 142 includes an end cap 146 which may define one or more fluid inlet and outlet ports, as will be discussed further with reference to FIGS. 7-9. In preferred embodiments, the motor 142 is a gerotor-type hydraulic motor. Disposed adjacent the end cap 146 is a port plate 148, and adjacent thereto (moving "forwardly", or to the left in FIG. 6) is a fluid displacement mechanism which, in the subject embodiment, comprises a gerotor assembly, generally designated 150. As is well known in the art, the gerotor assembly 150 may include a stator (e.g., an outer gear 152), which may be an internally-toothed ring member, and disposed therein, a rotor (e.g., an inner gear 154), which may be an externally-toothed star member, which undergoes orbital and rotational movement in response to pressurized fluid being communicated from an inlet port to one or more motor chambers. In such embodiments, the main drive shaft 122 is coupled to the inner gear 154 (e.g., by a splined connection). Rotation of the inner gear 154 within the outer gear 152 drives rotation of the shaft 122 about its central axis and also cause the shaft 122 to orbit about the central axis 103. It will be appreciated that the term "rotation" includes pure rotation as well as eccentric or wobbling type rotation. The inner gear 154 is also coupled to a secondary shaft 156 (e.g. a valve drive shaft). The rotational movement of the inner gear 154 is transmitted by means of the secondary shaft 156 to a rotatable disk member 158. As is also well known to those skilled in the art, the function of the rotatable disk member 158 is to control the communication of pressurized fluid from an inlet port to the gerotor gear set 150, and to control the communication of low pressure, exhaust fluid from the gerotor gear set 150 to an outlet port. Gerotor-type hydraulic motors can also include rollers in place of internal gear teeth that prevent direct contact between the rotor and the stator. Thus, Geroler® type hydraulic geroler motors sold by Eaton Corporation are considered gerotor-type hydraulic motors for the purposes of this disclosure. While gerotor-type hydraulic motors are preferred, other types of hydraulic motors can be used as well.

Figure 3:
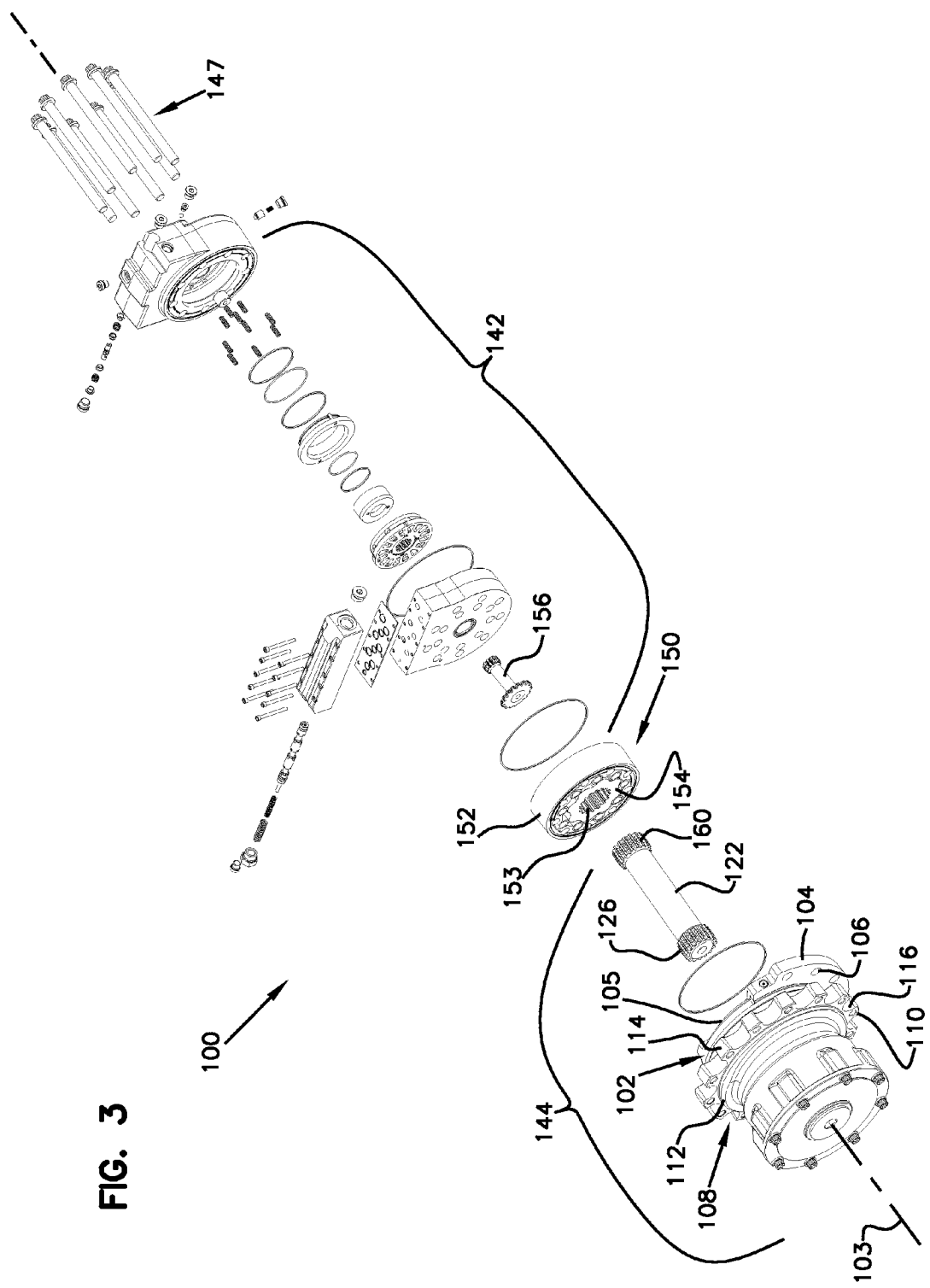
FIG. 3 is an isometric view of exemplary components of the combined hydraulic motor and brake of FIG. 1.
Figure 4:
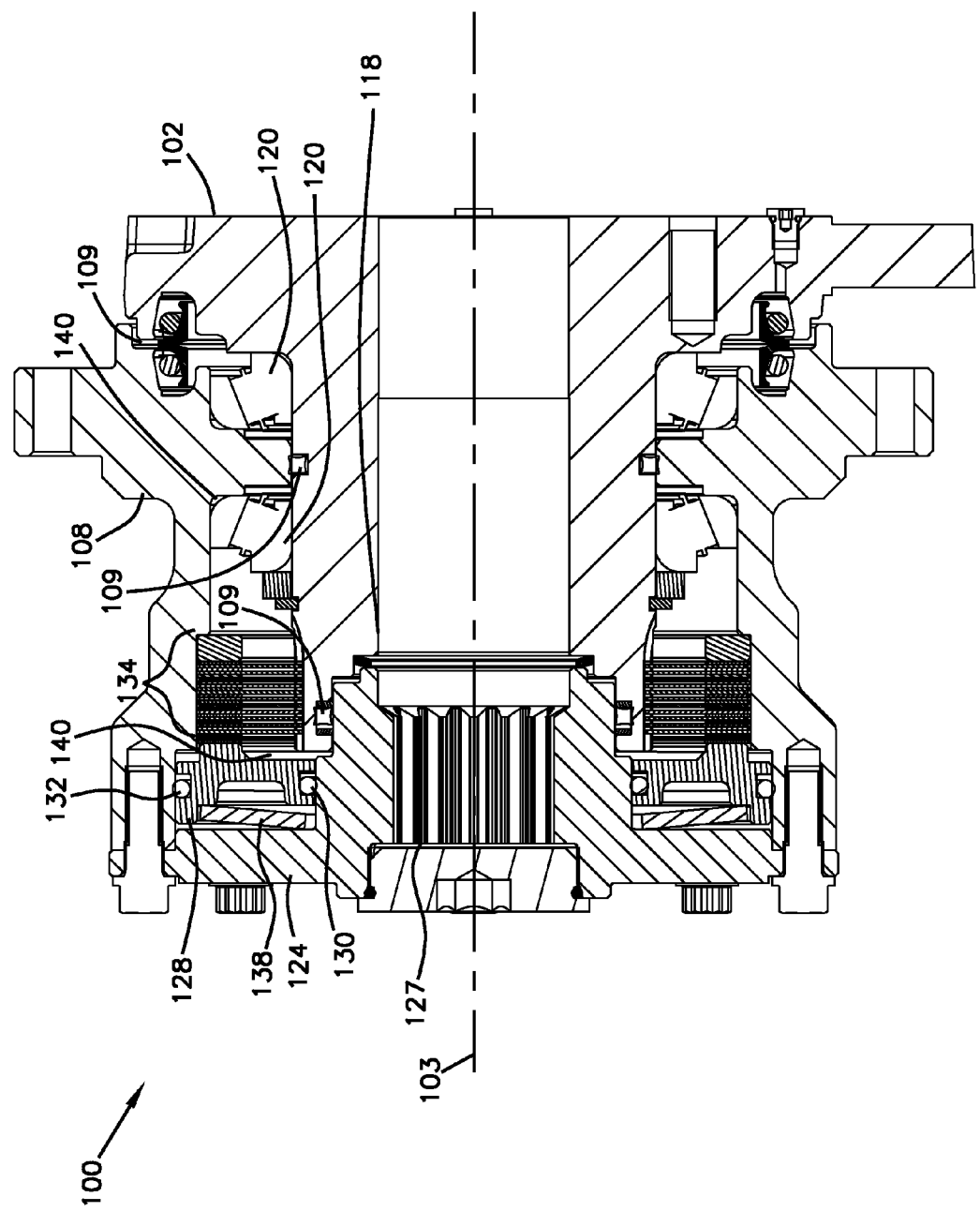
FIG. 4 is a cross-sectional view of a portion of the combined hydraulic motor and brake of FIG. 1.

Referring to FIGS. 3 and 6, the inner gear 154 of the motor 142 is in splined engagement with the main drive shaft 122. For example, the main drive shaft 122 has a rearward set of crowned splines 160 in splined engagement with internal splines 153 in the inner gear 154. The main drive shaft 122 also includes a forward set of crowned splines (e.g., splines 126 of FIG. 4) in splined engagement with internal splines 127 of coupler 124. The forward splines 126 of the main drive shaft 122 mate with the coupler splines 127 to affect torque transfer between the main drive shaft 122 and the coupler 124. One or more of the spline assemblies may be chamfered or beveled to aid in dynamic spline engagement.

The brake portion 144 of the combined hydraulic motor and brake assembly 100 includes a brake piston 128. The piston 128 may be a lock piston as is known in the art. The piston 128 may frictionally engage with and be carried with the coupler 124 and the driven hub 108, thus rotating when the coupler 124 and the driven hub 108 are rotated about the axis of rotation 103 by the main drive shaft 122. The piston 128 may include a plurality of sealing arrangements to prevent fluid leakage. Sealing arrangements may be disposed between the piston 128 and one or more other components of assembly 100. A first sealing arrangement may be located at an inside surface of the piston (e.g., to seal a piston inner diameter). For example, an inner radial piston seal 130 may be positioned between the piston 128 and the coupler 124 for frictionally engaging the piston 128 and the coupler 124. A second sealing arrangement may be located at an outside surface of the piston 128 from the first sealing arrangement (e.g., to seal a piston outer diameter). For example, an outer radial piston seal 132 may be positioned between the piston 128 and the driven hub 108 for frictionally engaging the piston 128 and the driven hub 108. Inner radial piston seal 130 and outer radial piston seal 132 may comprise any suitable sealing means for sealing piston 128. For example, each sealing arrangement may include one or more O-rings, X-rings, duo cone rings or other appropriate sealing structures. Seals may be constructed to be static or dynamic seals. However, regardless of seal-type utilized, inner radial piston seal 130 and outer radial piston seal 132 effectively become static seals when piston 128 rotates with the coupler 124 and the driven hub 108. Thus, piston seal life may improve and design flexibility may increase, as both piston seals are effectively static when the driven hub 108 rotates.

Figure 5:
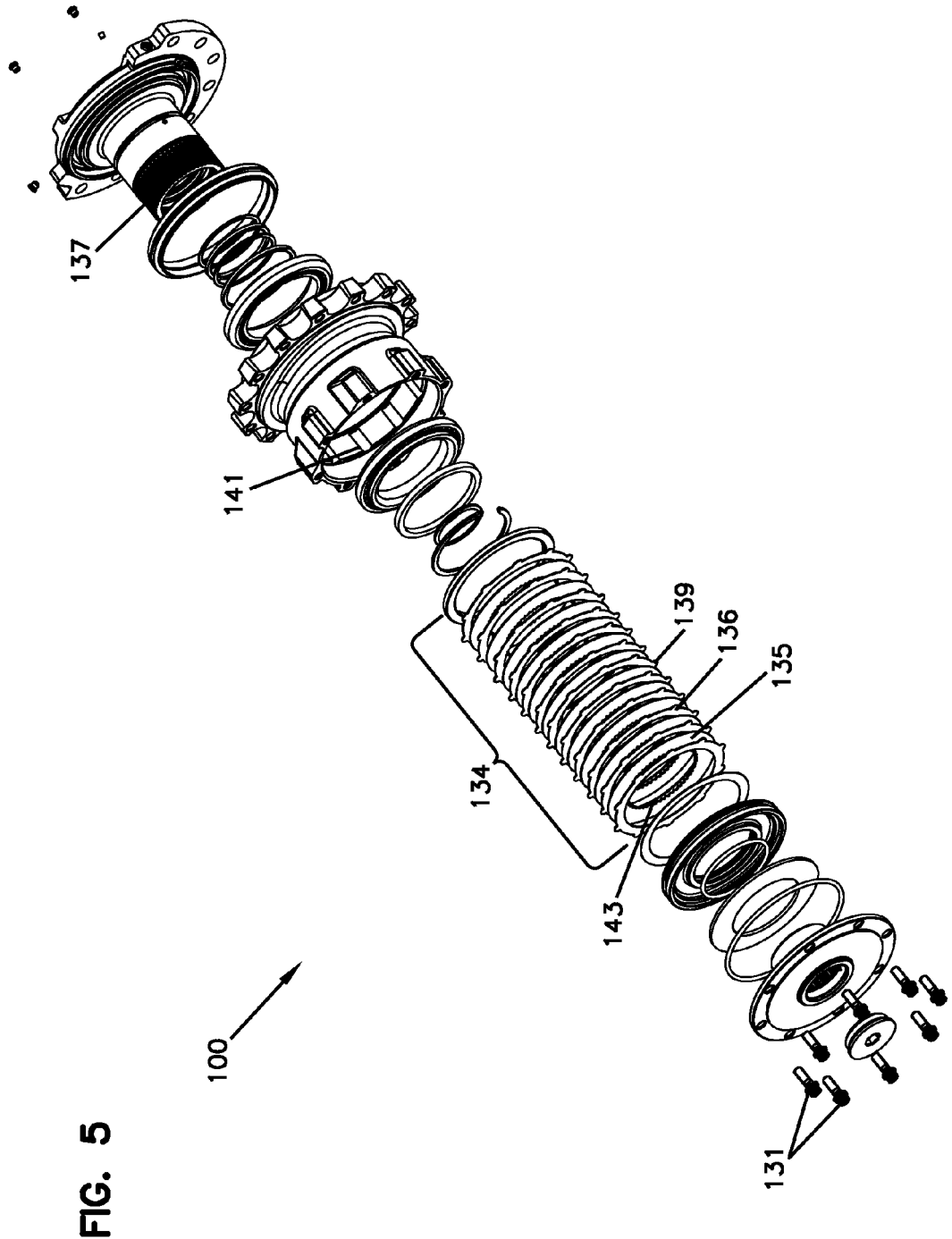
FIG. 5 is an isometric view of exemplary components of FIG. 4 including a brake pack suitable for use in the combined hydraulic motor and brake of FIG. 1.

The brake portion 144 of the combined hydraulic motor and brake assembly 100 also includes a brake disc assembly, or brake pack 134. FIG. 5 is an exploded isometric view of brake pack components according to embodiments of the disclosure. When the brake pack is compressed, relative rotation is not allowed between the driven hub 108 and stationary housing 102. Brake pack 134 may include first brake pads 135 mounted to the stationary housing 102 and second brake pads 136 carried by the driven hub 108 such that the second brake pads 136 rotate relative to the first brake pads 135 when the driven hub 108 rotates relative to the stationary housing 102. The first and second brake pads 135, 136 are interleaved relative to one another. A plurality of serrations 143 may be disposed on at least a portion of the interior diameter of the first brake pads 135. The serrations 143 engage with corresponding serrations 137 on the stationary housing 102 to limit relative rotation between the first brake pads 135 and the stationary housing 102. A plurality of tabs 139 may be disposed on outer diameters of the second brake pads 136. The tabs 139 fit within corresponding tab slots 141 defined by the driven hub 108 to limit relative rotation between the driven hub 108 and the second brake pads 136.

Referring back to FIG. 4, the brake assembly 144 of the combined hydraulic motor and brake assembly 100 includes a spring assembly 138 for actuating the brake pack 134. In some embodiments, spring assembly 138 may include a series of concentric springs. Concentric springs may be a plurality of conical disc shaped springs or washers located adjacent to one another. A first set of conical washers may be oriented in a first direction opposite to a second direction associated with a second set of conical washers. In one embodiment, spring assembly 138 comprises one or more Belleville washers or springs arranged in the described configuration.

The spring assembly 138 may be located between the piston 128 and the coupler 124. An area between the piston 128 and the coupler 124 may be defined as a spring chamber. The spring assembly 138 is compressed between the coupler 124 and the piston 128 such that the spring assembly is preloaded with a spring force. To engage the brake, the spring assembly 138 is configured to normally urge the piston 128 against the brake pack 134. Piston 128 may normally be biased to the right by the force of spring assembly 138 thereby compressing brake pack 134. According to the embodiments described herein, spring assembly 138 may actuate the brake pack 134 by applying a braking force through the piston 128 to the brake pack 134 to compress the first and second brake pads 135, 136 together such that relative rotation between the driven hub 108 and stationary housing 102 is resisted by friction between the first and second brake pads 135, 136. When the brake pack 134 is compressed, relative rotation between driven hub 108 and stationary housing 102 is resisted or prevented. To release the brake, a brake release mechanism is configured to urge the piston 128 away from the brake pack 134 to decrease the braking force. The brake release mechanism may comprise hydraulic fluid, pneumatic pressure or mechanical means that applies an opposite force against the piston 128, to counteract the spring force of the spring assembly 138. The combined hydraulic motor and brake assembly 100 may include a brake chamber 140 formed on the brake pad side of the piston 128 (i.e., the side opposite the spring assembly 138). To release the brake, brake chamber 140 may be pressurized. Brake chamber 140 may be sealed with one or more O-rings, X-rings or any other suitable sealing means. When the brake is released, rotation of the driven hub 108, coupler 124, piston 128, second brake pads 136 and spring assembly 138 relative to the stationary housing 102 is permitted. In certain embodiments, the chamber 140 is pressurized by placing the chamber 140 in fluid communication with a pilot/charge pressure of the hydraulic circuit powering the hydraulic motor 142.

Figure 7:
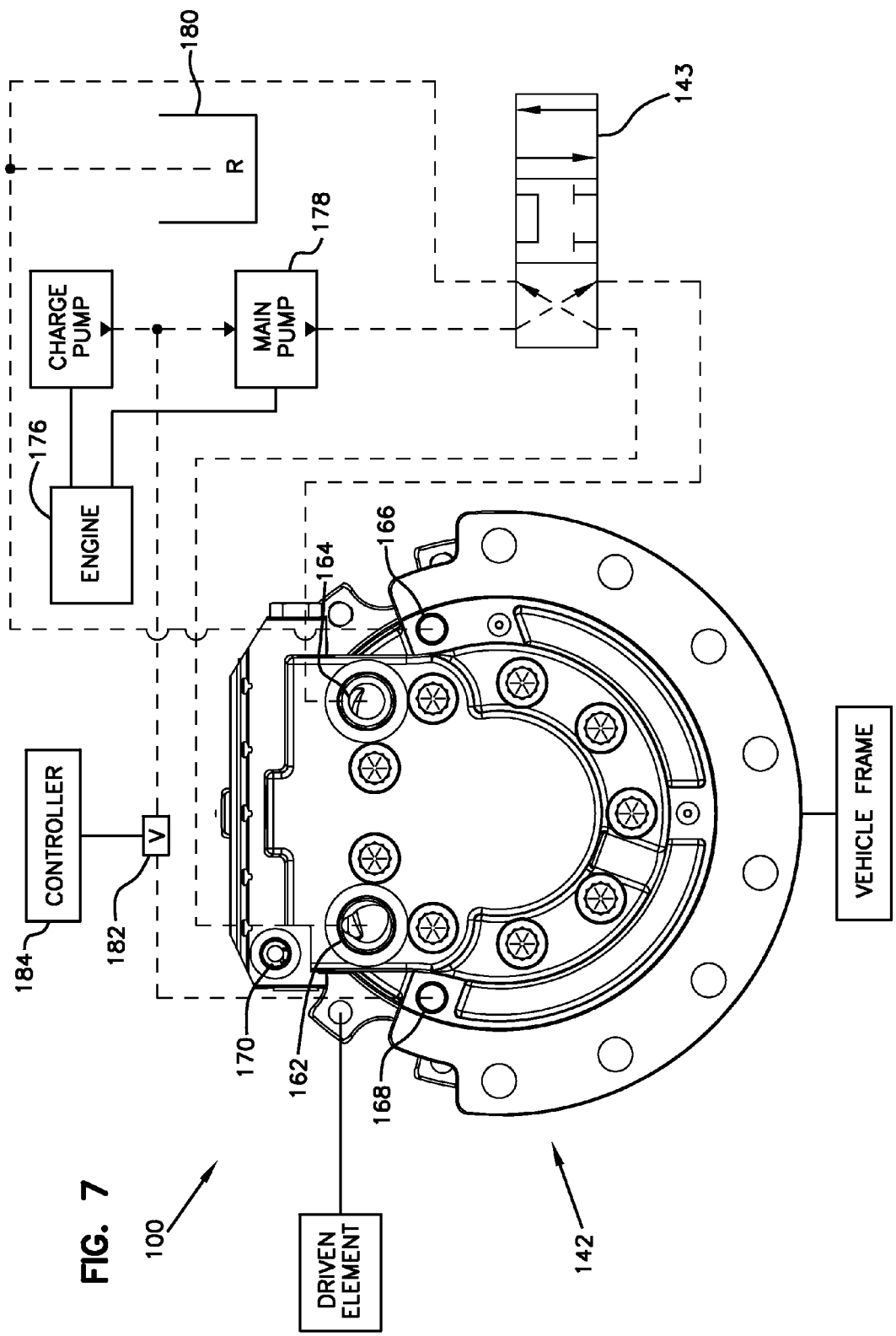
FIG. 7 is a combined schematic illustration of an exemplary combined hydraulic motor and brake implemented with a vehicle and a back view of a combined hydraulic motor and brake.
Figure 8:
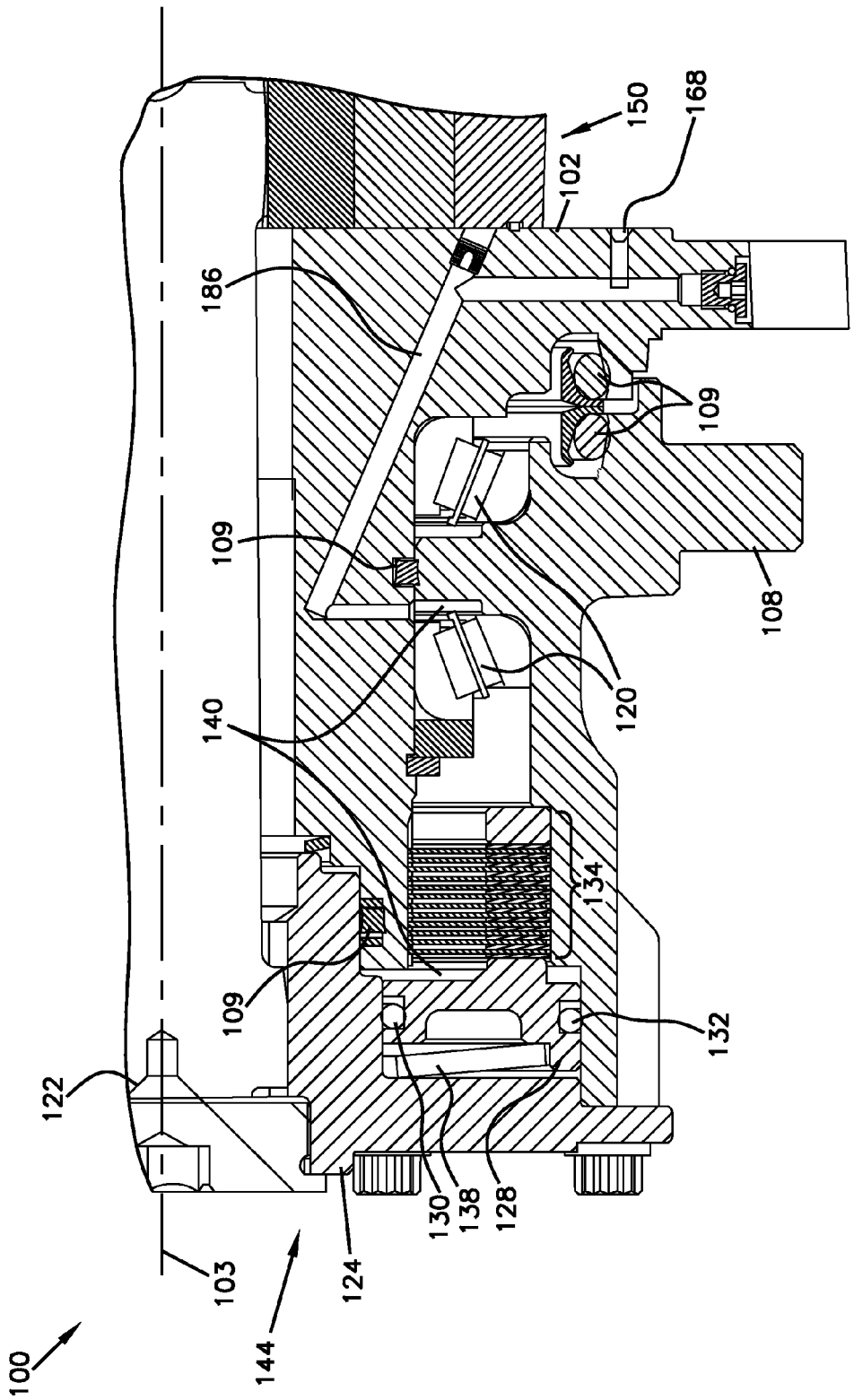
FIG. 8 is a cross-sectional view of a brake release cavity of the combined hydraulic motor and brake of FIG. 1.
Figure 9:
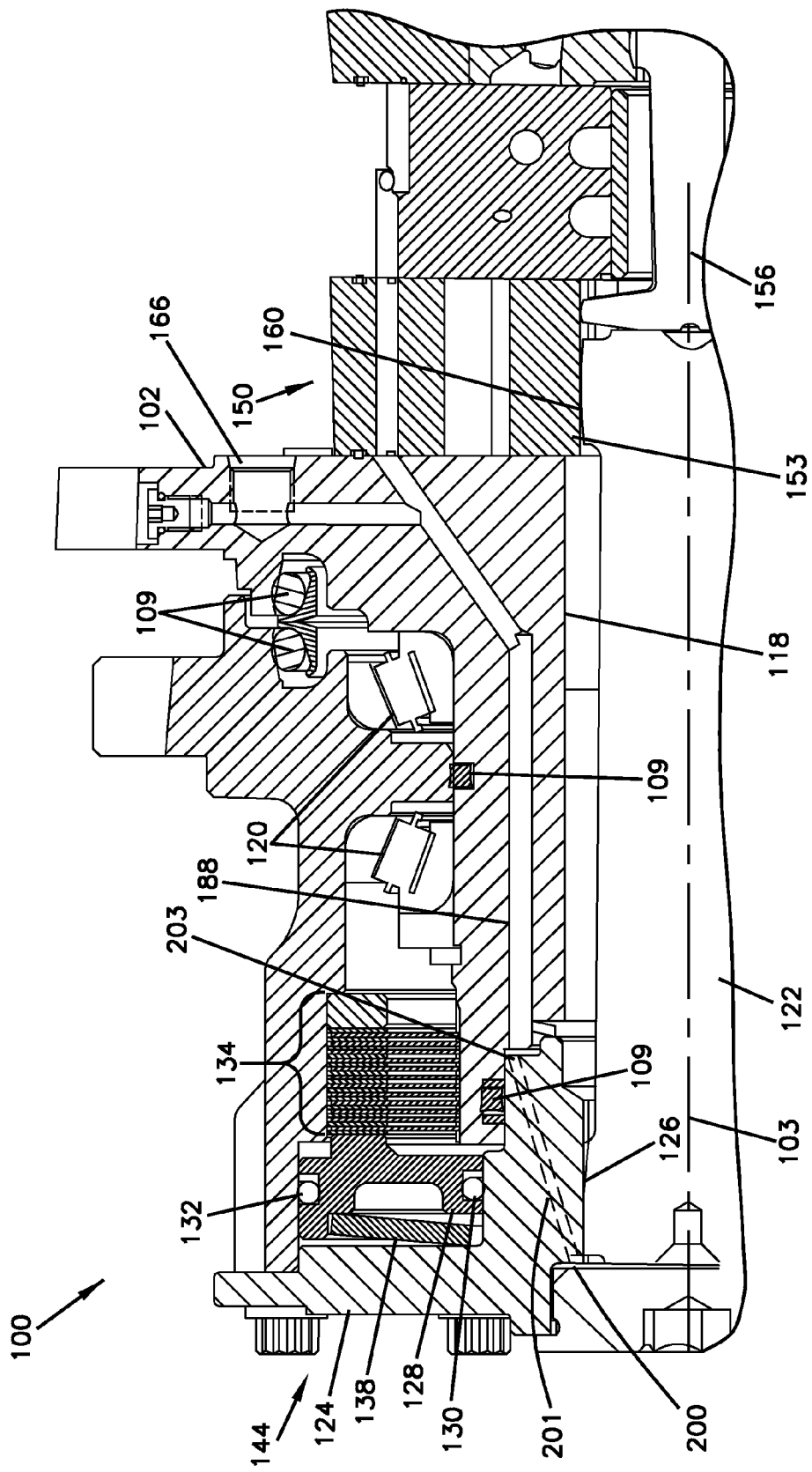
FIG. 9 is a cross-sectional view of a case drain cavity of the combined hydraulic motor and brake of FIG. 1.
Figure 10:
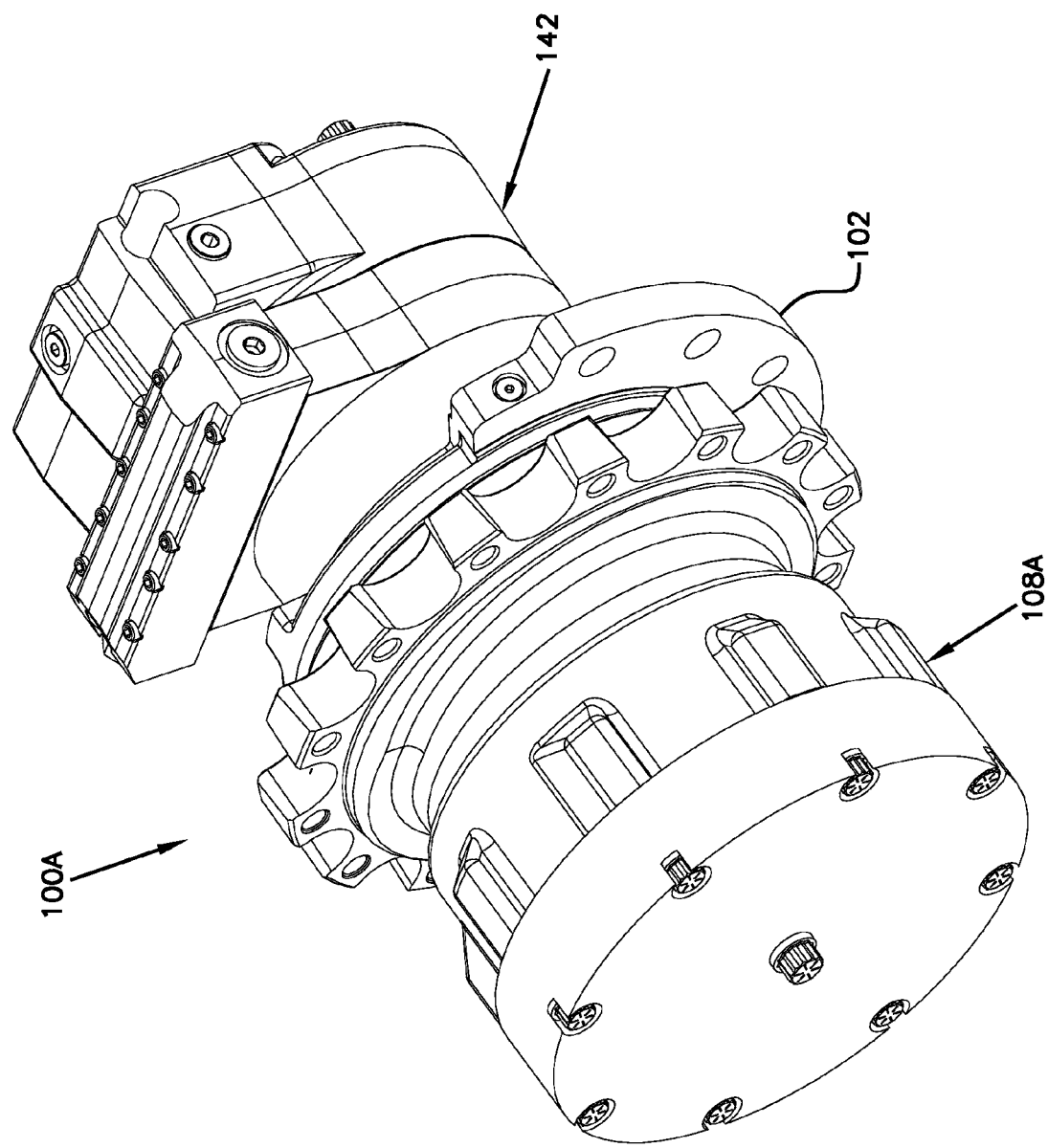
FIG. 10 is a perspective view of another hydraulic drive in accordance with the principles of the present disclosure.
Figure 11:
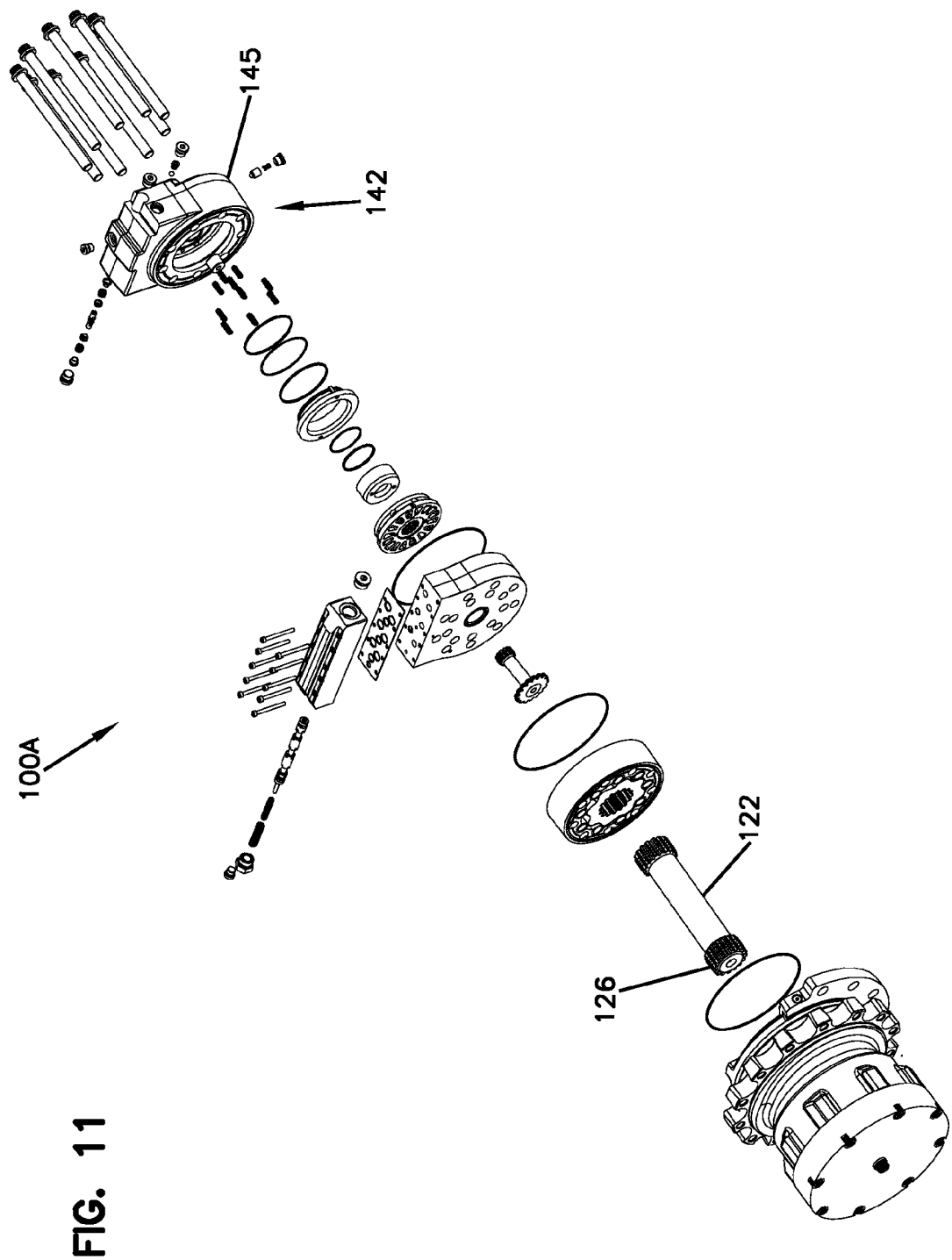
FIG. 11 is an exploded, perspective view of the hydraulic drive of FIG. 10.

The motor 142 of the combined hydraulic motor and brake assembly 100 may include a plurality of fluid ports, as shown in FIGS. 7-9. As is known in the art, the motor 142 may include one or more ports providing fluid inlets and/or outlets in communication with one or more portions of the interior of the motor 142. As is illustrated in FIG. 7 ports may include first and second main ports 162, 164. Ports 162, 164 may be inlet and/or outlet ports. Valve 143 controls fluid communication between a pump 178 and the ports 162, 164, and also controls fluid communication between the ports 162, 164 and a reservoir/tank 180. The pump 178 can be driven by a vehicle engine 176 or other engine. The valve 143 also has a neutral position that connects the pump 178 to the reservoir 180. In other embodiments, the valve can be configured to connect the ports 162, 164 to reservoir when in a neutral position. The valve 143 allows the motor 142 to be bi-directional. The motor 142 may further include a case drain port 166. Leaked or drained oil in the case is typically ported to the hydraulic reservoir tank 180, which is at low pressure, by use of a drain system employing internal valves within the case (e.g., shuttle valves, check valves, etc.). The motor 142 may include a brake release port 168. As is now well known to those skilled in the art, the hydraulic pressure to disengage the brake may be internal case pressure, or an external "pilot" pressure from a system charge pump 174, or any other suitable source of pressure. Charge pump 174 may be driven by the vehicle engine 176 and hydraulically coupled to the main pump 178. A controller 184 may at least partly control a control valve 182 fluidly connected to the brake release port 168 and/or, a high pressure side of the charge pump 174. The control valve 182 may be operable to selectively deliver pressurized fluid (e.g., charge or pilot pressure generated by the charge pump 174) to the brake release port 168. The motor 142 may also include a shift port 170. It is further contemplated that a combined hydraulic motor and brake assembly according to embodiments of the disclosure may include more or less ports than are shown in FIG. 7.

Referring to FIG. 8, passage 186 defined by the stationary housing 102 provides fluid communication between the charge port 168 and the brake chamber 140. When the valve 182 opens fluid communication between the charge pump 174 and the charge port 168, the passage 186 provides fluid communication between the charge port 168 and the brake chamber 140. In this way, charge pressure is provided to the brake chamber 140 causing the piston 128 to move away from the brake pack 134 against the bias of the spring 138 to release the brake.

Referring to FIG. 9, passage 188 defined at least in part by the stationary housing 102 provides fluid communication between the case drain port 166 and an interior of the assembly forming a case drain region. In operation of the motor 142, case drain fluid (e.g., hydraulic oil) is shuttled from the motor 142 through splines 160 into the shaft opening 118. The case drain fluid then flows axially along the shaft opening 118, through splines 126 to a cavity 200 at the front end of the shaft 122. From the cavity 200, the case drain fluid flows through passage 201 defined by the coupler 124 to a cavity 203 at the rear of the coupler 124. From the cavity 203, the case drain fluid flows through the passage 188 to the case drain port 166. From the case drain port 166, case drain flow proceeds to reservoir 180.

For certain applications, it is desirable to disengage the hydraulic portion of the motor from the driven hub. This allows the driven hub to be rotated freely without also rotating corresponding components of the hydraulic motor. Thus, the driven hub can free-wheel without resistance from the hydraulic motor. In the case of a vehicle, the ability to free-wheel can allow the vehicle to be easily towed. The ability to free-wheel is also applicable for part-time assist applications.

In certain embodiments of the present disclosure, a hydraulic drive can be operated in an engaged mode where the drive shaft is coupled to the driven hub in a direct drive arrangement and a disengaged mode where the drive shaft is decoupled from the driven hub. When the hydraulic drive is operated in the engaged mode, torque from the drive shaft is transferred to the driven hub causing the driven hub to rotate relative to the stationary housing. When the hydraulic drive is operated in the disengaged mode, the driven hub can free-wheel relative to the drive shaft. In certain embodiments, the hydraulic drive can be actuated between the engaged and disengaged modes mechanically without requiring the use of hydraulic power. This type of arrangement is advantageous for conditions where hydraulic power to the hydraulic drive has been lost. In other embodiments, the hydraulic drive can be actuated between the engaged mode and the disengaged mode hydraulically through the use of hydraulic pressure. This type of arrangement is advantageous because the operator can easily change modes from a location remote from the hydraulic drive location such as from within an operator cab. In still other embodiments, the hydraulic drive may be actuated between the engaged mode and the disengaged mode either mechanically or hydraulically.

Figure 12:
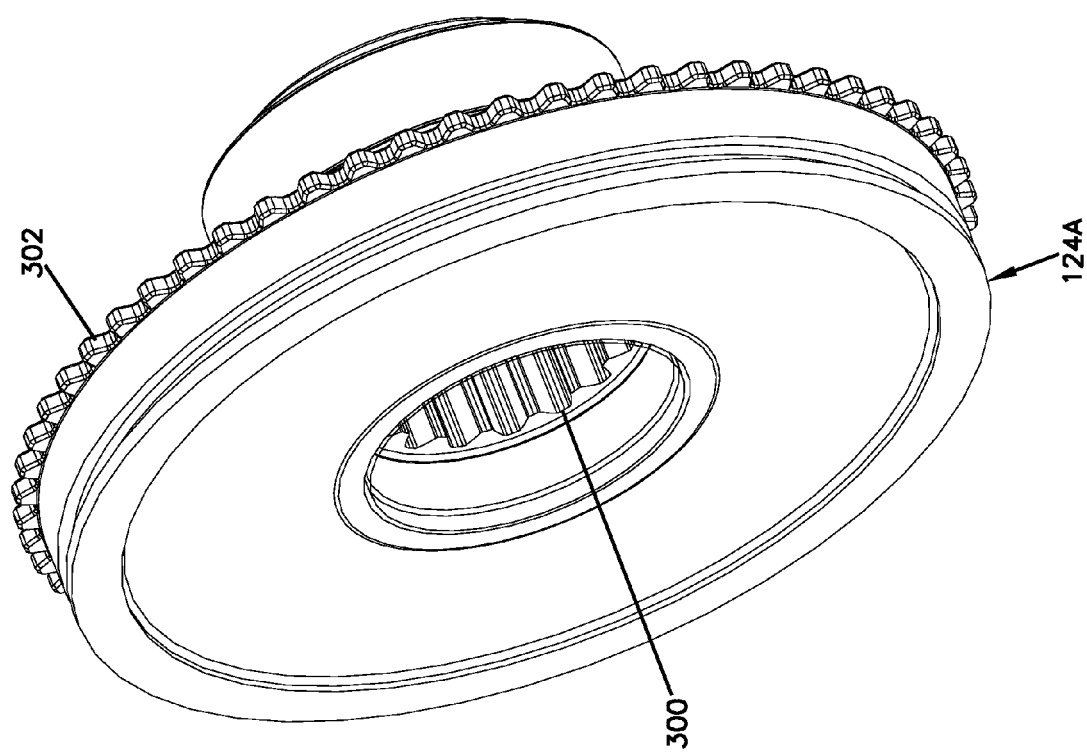
FIG. 12 is a perspective view of a coupler of the hydraulic drive of FIGS. 10 and 11.
Figure 13:
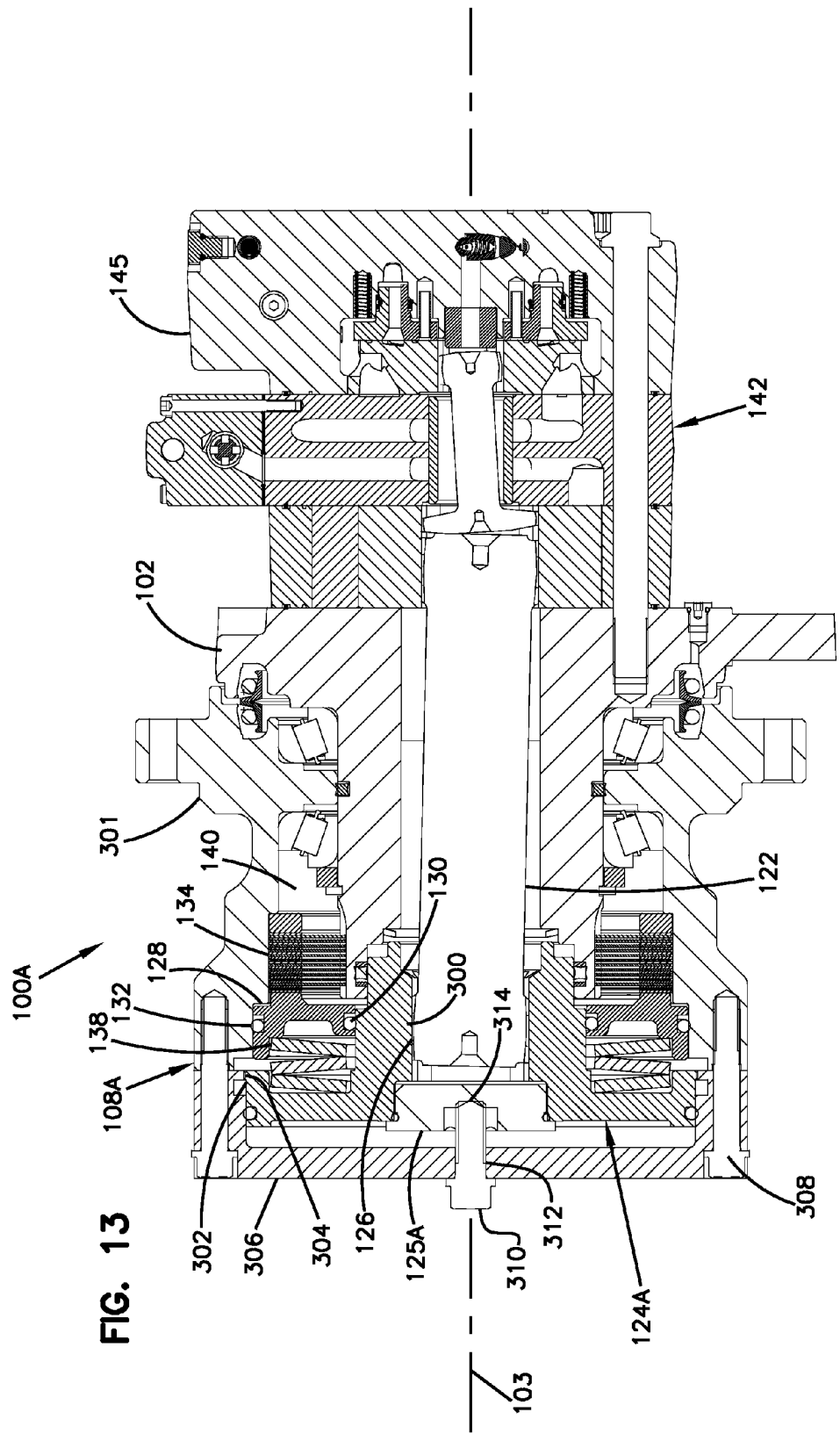
FIG. 13 is a cross-sectional view of the hydraulic drive of FIG. 10 with the hydraulic drive shown in an engaged mode.
Figure 14:
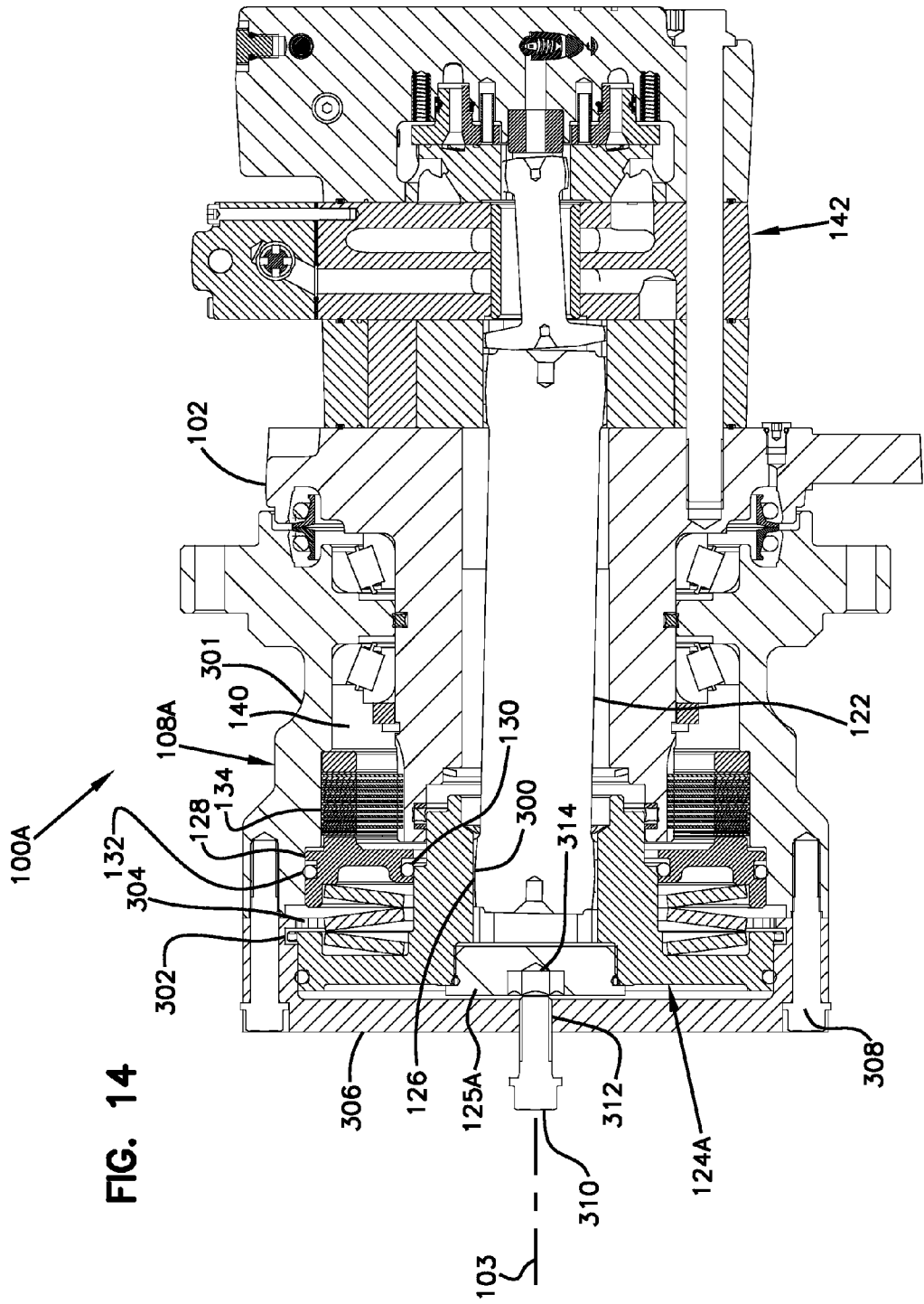
FIG. 14 is a cross-sectional view of the hydraulic drive of FIG. 10 with the hydraulic drive in a mechanically disengaged mode.
Figure 15:
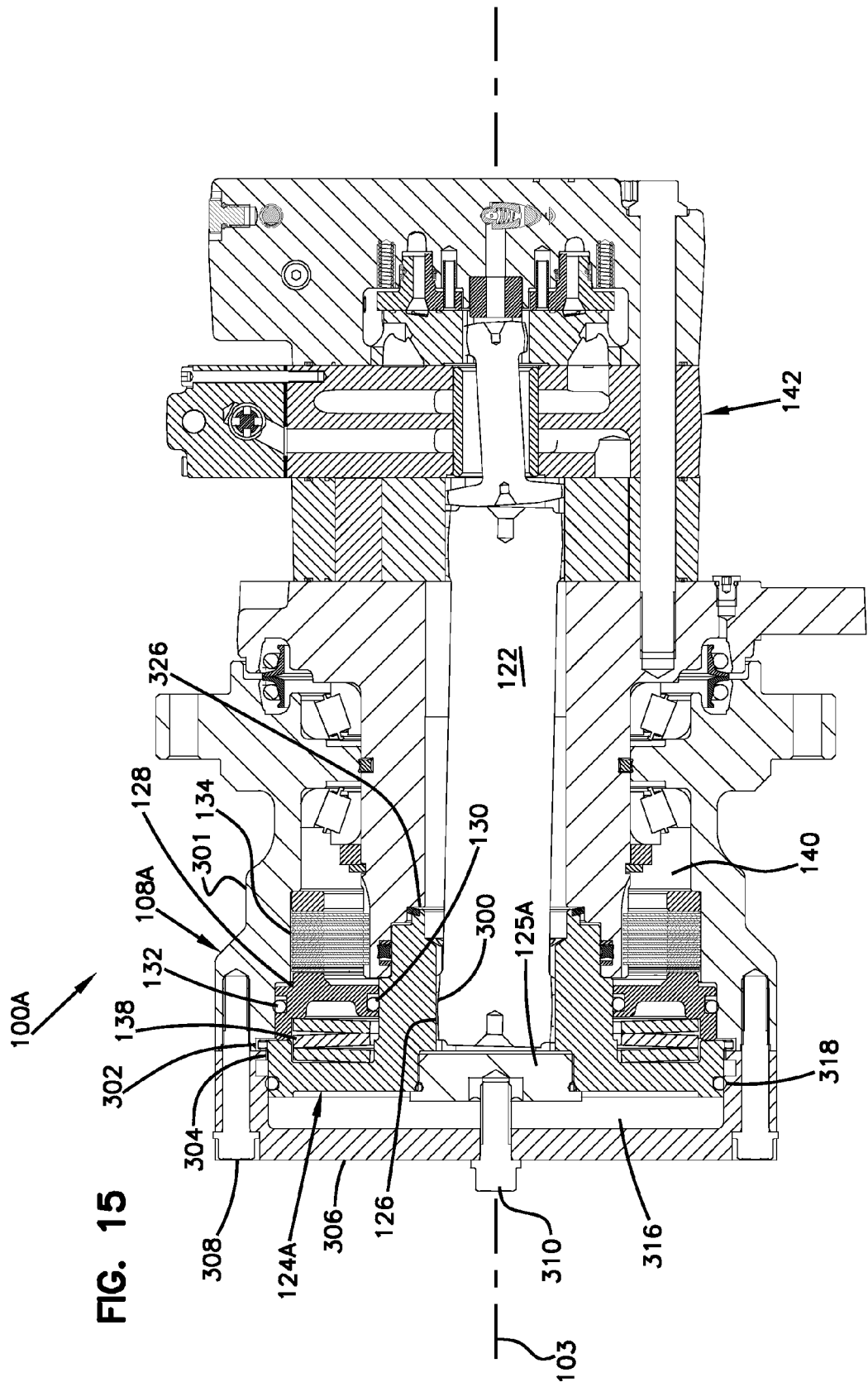
FIG. 15 is a cross-sectional view of the hydraulic drive of FIG. 10 with the hydraulic drive in a hydraulically disengaged mode.
Figure 16:
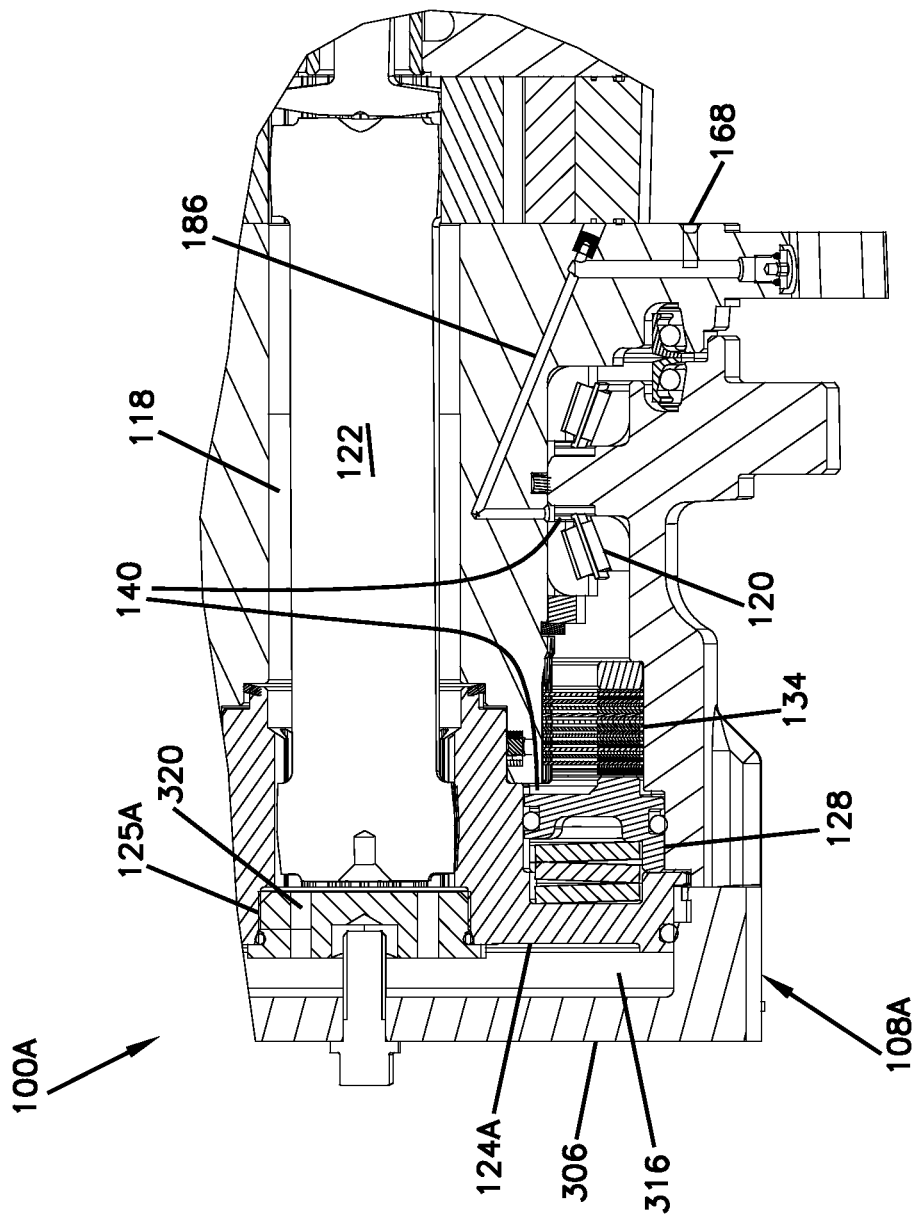
FIG. 16 is a cross-sectional view showing a brake release chamber and related flow passages of the hydraulic drive of FIG. 10.

FIGS. 10-18 illustrate another hydraulic drive 100A in accordance with the principles of the present disclosure. The hydraulic drive 100A has been modified as compared to the hydraulic motor and brake assembly 100 so as to be operable in either an engaged mode where the drive shaft is coupled to the driven hub in a direct drive arrangement, or a disengaged mode where the drive shaft is decoupled from the driven hub. For example, FIG. 13 shows the hydraulic drive 100A in an engaged mode, FIG. 14 shows the hydraulic drive 100A in a mechanically disengaged mode, and FIG. 15 shows the hydraulic drive 100A in a hydraulically disengaged mode. It will be appreciated that the hydraulic drive 100A has many of the same components previously described with respect to the hydraulic motor and brake assembly 100 and, for the sake of brevity such components will not be re-described with respect to the hydraulic drive 100A. Example components in the hydraulic drive 100A that have been previously described with respect to the hydraulic motor and brake assembly 100 include the hydraulic motor 142, the motor housing assembly 145, the stationary housing 102, the shaft passage 118, the bearings 120, the brake piston 128, the main drive shaft 122, the brake pack 134, the brake release chamber 140, and the spring assembly 138. As used herein, direct drive arrangement means the driving part (e.g., the coupler) and the driven part (e.g., the driven hub) rotate in unison with the one another.

It will be appreciated that the hydraulic drive 100A has a number of features adapted for allowing the hydraulic drive 100A to be operated in either a free-wheel mode or a direct-drive mode. For example, the hydraulic drive 100A includes a coupler 124A (see FIGS. 12 and 13) and driven hub 108A configured for selectively allowing torque to be transferred between the main drive shaft 122 and the driven hub 108A. The driven hub 108A includes a main body 301 and an end plate 306 secured to the main body 301 with fasteners 308. As shown at FIGS. 12 and 13, the coupler 124A includes inner splines 300 and outer splines 302. As shown at FIG. 13, the inner splines 300 form a splined engagement with the splines 126 of the main drive shaft 122 to allow torque to be transferred from the main drive shaft 122 to the coupler 124A. The splined engagement between the coupler 124A and the main drive shaft 122 also allows the coupler 124A to slide axially relative to the main drive shaft 122. The outer splines 302 are configured to form a splined engagement with inner splines 304 of the driven hub 108A. For example, FIG. 13 shows the hydraulic drive 100A in an engaged mode in which the outer splines 302 of the coupler 124A are in torque transmitting engagement with the inner splines 304 of the driven hub 108A such that torque transferred from the main drive shaft 122 to the coupler 124A is also transferred from the coupler 124A to the driven hub 108A via the splines 302, 304 causing the driven hub 108A to rotate relative to the stationary housing 102 about the axis of rotation 103. Similar to the previously disclosed embodiment, when the hydraulic drive 100A is operated in the engaged mode, the driven hub 108A, the coupler 124A, and the brake release piston 128 all rotate together in unison about the axis of rotation 103 such that seals 130, 132 function as stationary seals.

The splined connections between the coupler 124A and the driven hub 108A and between the coupler 124A and the main drive shaft 122 allow the coupler 124A to be moved axially relative to the main drive shaft 122 between the engaged position of FIG. 13 where the hydraulic drive 100A operates in the engaged mode and a disengaged position (FIG. 14 or FIG. 15) where the hydraulic drive 100A operates in a disengaged mode. In the disengaged mode, the driven hub 100A is able to free-wheel relative to the hydraulic motor 142, the coupler 124A and the main drive shaft 122. In the depicted embodiment of FIGS. 10-18, the coupler 124A can be positioned in two separate disengaged positions. For example, the coupler 124A can be moved axially relative to the drive shaft 122 from the engaged position of FIG. 13 to a mechanically disengaged position as shown at FIG. 14. When the coupler 124A is in the mechanically disengaged position of FIG. 14, the outer splines 302 are axially offset and disengaged from the inner splines 304 of the driven hub 108A such that no torque can be transferred from the coupler 124A to the driven hub 108A. The coupler 124A is also moveable from the engaged position of FIG. 13 to a hydraulically disengaged position as shown at FIG. 15. When the coupler 124A is in the hydraulically disengaged position of FIG. 15, the outer splines 302 of the coupler 124A are axially offset and disengaged from the inner splines 304 of the driven hub 108A such that no torque can be transferred between the coupler 124A and the driven hub 108A. Thus, whenever the coupler 124A is in either the mechanically disengaged position or the hydraulically disengaged position, the hydraulic drive 100A is in the disengaged mode in which the driven hub 108A can free-wheel relative to the coupler 124A, the drive shaft 122 and the hydraulic motor 142.

Referring to FIG. 14, the hydraulic drive 100A includes features that allow the coupler 124A to be moved axially between the mechanically disengaged position of FIG. 14 and the engaged position of FIG. 13. For example, the hydraulic drive 100A includes a central fastener in the form of a bolt 310 that is aligned along the axis of rotation 103. The bolt 310 includes external threads that thread within corresponding internal threads defined within an opening 312 defined through the end plate 306. An end 314 of the bolt 310 engages a plug 125A secured within the coupler 124A. By turning the bolt 310 in a first direction (e.g., manually with a tool such as a wrench), the bolt 310 unthreads from the end plate 306 causing the bolt 310 to move axially outwardly from the end plate 306. As the bolt 310 moves axially outwardly from the end plate 306, the end plug 125A and the coupler 124A move from the engaged position of FIG. 13 to the disengaged position of FIG. 14. The spring assembly 138 provides spring pressure that causes the coupler 124A to follow the bolt 310. By turning the bolt 310 in the opposite direction within the opening 312, the bolt 310 threads into the end plate 306 thereby pushing the end plug 125A and the coupler 124A from the disengaged position of FIG. 14 to the engaged position of FIG. 13.

It will be appreciated that the spring assembly 138 is compressed between the coupler 124A and the brake release piston 128. When the coupler 124A is moved to the mechanically disengaged position of FIG. 14, the spring assembly 138 is decompressed thereby terminating the spring-based braking force applied to the brake pack 134 through the piston 128. In this way, when the coupler 124A is in the mechanically disengaged position of FIG. 14, neither the coupler 124A, the hydraulic motor 142, or the brake pack 134 interfere with the ability of the driven hub 108A to freely rotate relative to the stationary housing 102 about the axis 103.

When the coupler 124A is in the mechanically disengaged position, the inner piston seal 130 can disengage from the coupler 124A while the outer piston seal 132 remains in contact with the driven hub 108A. Thus, as the driven hub 108A free wheels about the axis of rotation 103, the piston 128 can be carried with the driven hub 108A such that the piston 128 and the driven hub 108A rotate in unison about the axis of rotation 103. Because the inner piston seal 130 is disengaged from the coupler 124A, the inner piston seal 130 does not experience wear as the driven hub 108A free wheels relative to the coupler 124A. Additionally, since the piston 128 is carried with the driven hub 108A as the driven hub 108A rotates, the outer seal 132 remains stationary relative to the driven hub 108A and does not experience wear.

When the bolt 310 is in the position of FIG. 13, the end 314 of the bolt 310 engages the end plug 125A thereby retaining the coupler 124A in the engaged position against the bias of the spring assembly 138. Thus, the bolt 310 assists in generating sufficient force for compressing the spring assembly 138 between the coupler 124A and the brake piston 128 so as to generate the spring-based braking force used to compress the brake pack 134. When the bolt 310 is unthreaded from the end plate 306, the bolt 310 moves away from the main shaft 122. As the bolt 310 moves away from the main shaft 122, spring pressure from the spring assembly 138 forces the coupler 124A to follow the bolt 310 and move from the engaged position for FIG. 13 to the mechanically disengaged position of FIG. 14. Once the coupler 124A reaches the disengaged position of FIG. 14, the spring assembly 138 is decompressed such that little to no braking pressure is applied by the spring assembly 138 to the brake piston 128. Without such braking pressure, the brake pack 134 is not compressed such that the brake does not interfere with the ability of the driven hub 108A to freely rotate relative to the stationary housing 102 about the axis of rotation 103. When the bolt 310 is threaded back into the end plate 306, the bolt forces the end plug 125A and the coupler 124A to move from the mechanically disengaged position of FIG. 14 back to the engaged position of FIG. 13. As the coupler 124A moves back toward the engaged position of FIG. 13, the spring assembly 138 is recompressed so as to apply the braking force through the brake piston 128 to the brake pack 134.

The hydraulic drive 100A also includes structure for allowing the coupler 124A to be moved via hydraulic pressure from the engaged position of FIG. 13 to the hydraulically disengaged position of FIG. 15. As shown at FIG. 15, the hydraulic drive 100A defines a drive release chamber 316 between the end plate 306 and the coupler 124A. A radial seal 318 is provided between the coupler 124A and the end plate 306 for sealing the drive release chamber 316. The end plug 125A includes passages 320 (see FIG. 17) that provide fluid communication between the shaft passage 118 and the drive release chamber 316. Thus, the drive release chamber 316 is in fluid communication with the case drain region or case drain circuit within the interior of the hydraulic drive 100A.

Figure 17:
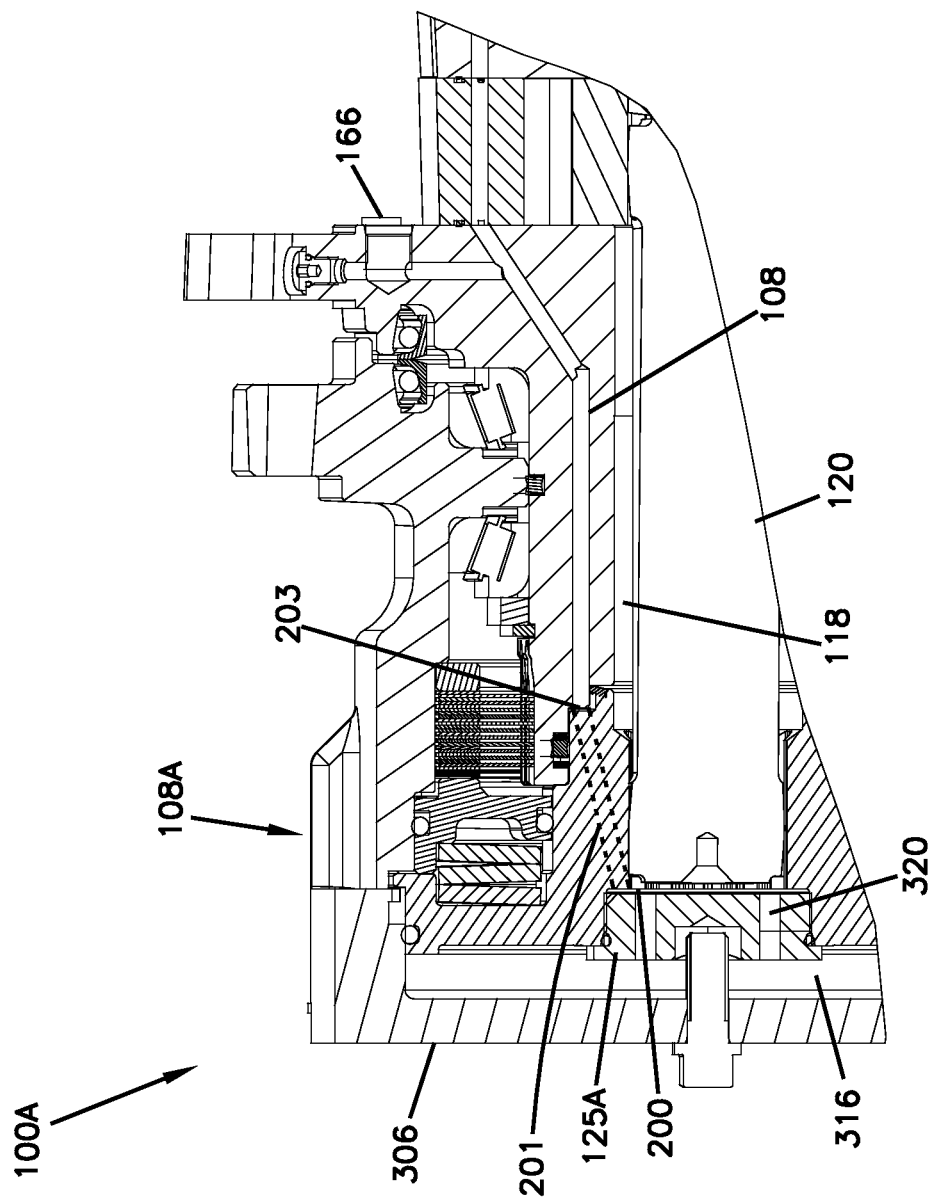
FIG. 17 is a cross-sectional view showing a hydraulic drive disengagement chamber and related hydraulic flow passages of the hydraulic drive of FIG. 10.

To hydraulically move the coupler 124A from the engaged position of FIG. 13 to the hydraulically disengaged position of FIG. 15, the case drain port 166 is disconnected from reservoir 180 via valve 322 and the charge pump 174 is connected to the case drain port 166 via valve 324 (see FIGS. 17 and 18). The application of charge pressure to the case port 166 causes the case drain region within the hydraulic drive 100A to be pressurized to charge pressure. Since the drive release chamber 316 is connected to the case drain region by the passages 320 through the end plug 125A, charge pressure is also applied to the drive release chamber 316. The application of charge pressure to the drive release chamber 316 provides enough hydraulic pressure to move the coupler 124A from the engaged position of FIG. 13 to the hydraulically disengaged position of FIG. 15. When the coupler 124A reaches the hydraulically disengaged position of FIG. 15, the coupler 124A engages a positive stop 326 (see FIG. 15) on the stationary housing 102 to stop further movement of the coupler 124A. To release the brake, charge pressure is also applied to charge port 168 causing the brake release chamber 140 to be pressurized to charge pressure. With the brake chamber 140 pressurized to charge pressure, the brake piston 128 is hydraulically forced away from the brake pack 134 with a hydraulic force that overcomes the braking force provided by the spring assembly 138. Thus, the brake is released thereby allowing the driven hub 108A to rotate freely relative to the stationary housing 102. It will be appreciated that the surface area of the coupler 124A exposed at the drive release chamber 316 is larger than the surface area of the piston 128 exposed at the brake release chamber 140. Thus, the coupler 124A remains in the hydraulically disengaged position of FIG. 15 even when the brake release chamber 140 is pressurized.

The described embodiments may be implemented with any hydraulic device that includes a hydraulic motor and brake assembly. The described embodiments may also provide a smaller form-factor hydraulic motor and brake assembly, further decreasing costs and increasing design flexibility.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A hydraulic drive comprising:
    a stationary housing defining a shaft passage;
    a main drive shaft having a first end and a second end, the main drive shaft being rotatable within the stationary housing, the main drive shaft extending through the shaft passage of the stationary housing, the main drive shaft being coupled to an inner gear by a splined connection located adjacent the second end;
    a valve drive shaft having a torque transmitting connection with the main drive shaft by the inner gear located adjacent the second end of the main drive shaft;
    a hydraulic motor for rotating the valve drive shaft, the valve drive shaft transferring torque to the main drive shaft such that the main drive shaft rotates relative to the stationary housing, the hydraulic motor including a motor housing assembly that is mounted to the stationary housing;
    a driven hub mounted over the stationary housing, the driven hub including a plurality of openings for receiving fasteners used to mount the driven hub to a rotatable wheel;
    a sealing arrangement disposed between the stationary housing and the driven hub;
    a coupling/decoupling arrangement mounted over the first end of the main drive shaft, the coupling/decoupling arrangement allowing the hydraulic drive to be operated in an engaged mode where the main drive shaft is coupled to the driven hub in a direct drive arrangement and a disengaged mode where the main drive shaft is decoupled from the driven hub, wherein when the hydraulic drive is operated in the engaged mode, torque from the main drive shaft is transferred to the driven hub causing the driven hub to rotate relative to the stationary housing, and wherein when the hydraulic drive is operated in the disengaged mode, the driven hub can free wheel relative to the main drive shaft;
    a central fastener being aligned along an axis of rotation that extends through the shaft passage, an end of the central fastener engaging a plug secured within the coupling/decoupling arrangement, the central fastener being rotatable in a first direction to cause the central fastener to move axially outwardly such that the plug and the coupling/decoupling arrangement move from the engaged mode to the disengaged mode, and the central fastener being rotatable in the opposite, second direction to push the plug and the coupling/decoupling arrangement from the disengaged mode to the engaged mode;
    a bearing positioned between the driven hub and the stationary housing for allowing the driven hub to rotate relative to the stationary housing about the axis of rotation that extends through the shaft passage;
    a brake including a brake pack having first brake pads mounted to the stationary housing and second brake pads carried by the driven hub, the first and second brake pads being interleaved relative to one another;
    a piston engaged with and carried with the coupling/decoupling arrangement and the driven hub, the piston rotating when the coupling/decoupling arrangement and the driven hub are rotated about the axis of rotation by the main drive shaft; and
    a spring for actuating the brake by applying a braking force through the piston to the brake pack to compress the first and second brake pads together such that relative rotation between the driven hub and the stationary housing is resisted by friction between the first and second brake pads, and wherein the brake is released by applying a brake release hydraulic pressure to the piston to generate a brake release force that opposes the braking force.

2. The hydraulic drive of claim 1, wherein the hydraulic motor is a gerotor-type hydraulic motor.

3. The hydraulic drive of claim 1, wherein the coupling/decoupling arrangement is configured such that the hydraulic drive can be mechanically actuated between the engaged and disengaged modes without requiring the use of hydraulic power.

4. The hydraulic drive of claim 1, wherein the coupling/decoupling arrangement is configured such that the hydraulic drive can be hydraulically actuated between the engaged and disengaged modes.

5. The hydraulic drive of claim 1, wherein the coupling/decoupling arrangement is configured such that the hydraulic drive can be mechanically actuated between the engaged and disengaged modes without requiring the use of hydraulic power, and wherein the coupling/decoupling arrangement is also configured such that the hydraulic drive can be hydraulically actuated between the engaged and disengaged modes.

6. The hydraulic drive of claim 1, wherein the coupling/decoupling arrangement includes a coupler moveable between an engaged position and a disengaged position, wherein when the coupler is in the engaged position the coupler is adapted to transfer torque between the main drive shaft and the driven hub such that the hydraulic drive is operable in the engaged mode, and wherein when the coupler is in the disengaged position the coupler is adapted to not transfer torque between the main drive shaft and the driven hub such that the hydraulic drive is operable in the disengaged mode.

7. The hydraulic drive of claim 6, wherein the coupler is connected to the main drive shaft by a torque transmitting connection that allows the coupler to slide axially relative to the main drive shaft between the engaged and disengaged positions.

8. The hydraulic drive of claim 7, wherein the coupler includes outer torque transfer elements that engage inner torque transfer elements of the driven hub when the coupler is in the engaged position and that disengage the inner torque transfer elements of the driven hub when the coupler is in the disengaged position.

9. The hydraulic drive of claim 8, wherein the inner and outer torque transfer elements include splines, and wherein the torque transmitting connection is a splined interface.

10. The hydraulic drive of claim 1, wherein the coupling/decoupling arrangement includes a coupler moveable along the axis of rotation between an engaged position and a disengaged position, wherein when the coupler is in the engaged position the coupler is adapted to transfer torque from the main drive shaft to the driven hub such that the hydraulic drive is operable in the engaged mode, and wherein when the coupler is in the disengaged position the coupler is adapted to not transfer torque between the main drive shaft and the driven hub such that the hydraulic drive is operable in the disengaged mode.

11. The hydraulic drive of claim 1, wherein the coupling/decoupling arrangement includes a coupler moveable between an engaged position and a disengaged position, wherein when the coupler is in the engaged position the coupler is adapted to transfer torque from the main drive shaft to the driven hub such that the hydraulic drive is operable in the engaged mode, wherein when the coupler is in the disengaged position the coupler is adapted to not transfer torque between the main drive shaft and the driven hub such that the hydraulic drive is operable in the disengaged mode, wherein a mechanical fastener is positionable in a retaining position where the mechanical fastener retains the coupler in the engaged position, and wherein the spring moves the coupler from the engaged position to the disengaged position when the mechanical fastener is moved from the retaining position.

12. The hydraulic drive of claim 11, wherein the coupler is movable along the axis between the engaged and disengaged positions, wherein the spring is positioned between the coupler and the piston, and wherein when the spring moves the coupler from the engaged position to the disengaged position the braking force is released.

13. The hydraulic drive of claim 12, wherein the piston has a first axial side positioned opposite from a second axial side, wherein the spring is positioned and the coupler are positioned at the first axial side of the piston, wherein a brake release chamber is positioned at the second axial side of the piston, wherein the brake release hydraulic pressure is applied to the brake release chamber to generate the brake release force, wherein the brake release force compresses the spring between the piston and the coupler, wherein the coupler includes a first axial side and an opposite second axial side, wherein the second axial side of the coupler faces the first axial side of the piston, wherein the disengaged position is a first disengaged position, wherein the coupler is also positionable in a second disengaged position, wherein the engaged position is axially between the first and second disengaged positions, wherein a de-coupling chamber is defined at the first axial side of the coupler for receiving a de-coupling hydraulic pressure used to move the coupler along the axis from the engaged position to the second disengaged position where the coupler is adapted to not transfer torque between the main drive shaft and the driven hub such that the hydraulic drive is operable in the disengaged mode, and wherein the stationary housing includes a positive stop that stops axial movement of the coupler when the coupler reaches the second disengaged position.

14. The hydraulic drive of claim 13, wherein the de-coupling chamber is defined between the first side of the coupler and an axial end cap connected to and carried with the driven hub, and wherein the mechanical fastener includes an axial bolt threaded through the end cap that retains the coupler in the first position when the axial bolt is in the retaining position, the axial bolt being aligned along the axis of rotation.

15. The hydraulic drive of claim 1, wherein the piston has a first axial side positioned opposite from a second axial side, wherein the spring is positioned and the coupler are positioned at the first axial side of the piston, wherein a brake release chamber is positioned at the second axial side of the piston, wherein the brake release hydraulic pressure is applied to the brake release chamber to generate the brake release force, wherein the brake release force compresses the spring between the piston and the coupler, wherein the coupler includes a first axial side and an opposite second axial side, wherein the second axial side of the coupler faces the first axial side of the piston, wherein a de-coupling chamber is defined at the first axial side of the coupler for receiving a de-coupling hydraulic pressure used to move the coupler along the axis from the engaged position to the disengaged position, and wherein the stationary housing includes a positive stop that stops axial movement of the coupler when the coupler reaches the disengaged position.

16. The hydraulic drive of claim 1, wherein the driven hub includes a main body and a plurality of tabs projecting radially outwardly from the main body, the plurality of tabs being separated by pockets such that the plurality of tabs are circumferentially spaced around a perimeter of the main body of the driven hub.

17. The hydraulic drive of claim 16, wherein the plurality of openings of the driven hub are defined through each one of the plurality of tabs, the pockets being aligned with the plurality of openings to facilitate accessing the plurality of openings.

18. The hydraulic drive of claim 1, wherein the coupling/decoupling arrangement is located radially outside of the brake.

19. A hydraulic drive comprising:
a stationary housing;
a drive shaft that extends through the stationary housing;
a hydraulic motor for rotating the drive shaft relative to the stationary housing;
a driven hub adapted to be connected to a rotatable driven element;
a coupling/decoupling arrangement that allows the hydraulic drive to be operated in an engaged mode where the drive shaft is coupled to the driven hub in a direct drive arrangement and a disengaged mode where the drive shaft is decoupled from the driven hub, wherein when the hydraulic drive is operated in the engaged mode torque from the drive shaft is transferred to the driven hub causing the driven hub to rotate relative to the stationary housing, and wherein when the hydraulic drive is operated in the disengaged mode the driven hub can free wheel relative to the drive shaft;
a bearing between the driven hub and the stationary housing for allowing the driven hub to rotate relative to the stationary housing about an axis of rotation defined by the bearing;
a brake including a brake pack having first brake pads mounted to the stationary housing and second brake pads carried by the driven hub, the first and second brake pads being interleaved relative to one another;
a piston; and
a spring for actuating the brake by applying a braking force through the piston to the brake pack to compress the first and second brake pads together such that relative rotation between the driven hub and the stationary housing is resisted by friction between the first and second brake pads, and wherein the brake is released by applying a brake release hydraulic pressure to the piston to generate a brake release force that opposes the braking force;
wherein the coupling/decoupling arrangement includes a coupler moveable between an engaged position and a disengaged position, wherein when the coupler is in the engaged position the coupler is adapted to transfer torque from the drive shaft to the driven hub such that the hydraulic drive is operable in the engaged mode, wherein when the coupler is in the disengaged position the coupler is adapted to not transfer torque between the drive shaft and the driven hub such that the hydraulic drive is operable in the disengaged mode, wherein a mechanical fastener is positionable in a retaining position where the mechanical fastener retains the coupler in the engaged position, and wherein the spring moves the coupler from the engaged position to the disengaged position when the mechanical fastener is moved from the retaining position.

20. The hydraulic drive of claim 19, wherein the coupler is movable along the axis between the engaged and disengaged positions, wherein the spring is positioned between the coupler and the piston, and wherein when the spring moves the coupler from the engaged position to the disengaged position the braking force is released.

21. The hydraulic drive of claim 20, wherein the piston has a first axial side positioned opposite from a second axial side, wherein the spring is positioned and the coupler are positioned at the first axial side of the piston, wherein a brake release chamber is positioned at the second axial side of the piston, wherein the brake release hydraulic pressure is applied to the brake release chamber to generate the brake release force, wherein the brake release force compresses the spring between the piston and the coupler, wherein the coupler includes a first axial side and an opposite second axial side, wherein the second axial side of the coupler faces the first axial side of the piston, wherein the disengaged position is a first disengaged position, wherein the coupler is also positionable in a second disengaged position, wherein the engaged position is axially between the first and second disengaged positions, wherein a de-coupling chamber is defined at the first axial side of the coupler for receiving a de-coupling hydraulic pressure used to move the coupler along the axis from the engaged position to the second disengaged position where the coupler is adapted to not transfer torque between the drive shaft and the driven hub such that the hydraulic drive is operable in the disengaged mode, and wherein the stationary housing includes a positive stop that stops axial movement of the coupler when the coupler reaches the second disengaged position.

22. The hydraulic drive of claim 21, wherein the de-coupling chamber is defined between the first side of the coupler and an axial end cap connected to and carried with the driven hub, and wherein the mechanical fastener includes an axial bolt threaded through the end cap that retains the coupler in the first position when the axial bolt is in the retaining position, the axial bolt being aligned along the axis of rotation.

23. A hydraulic drive comprising:
a stationary housing;
a drive shaft that extends through the stationary housing;
a hydraulic motor for rotating the drive shaft relative to the stationary housing;
a driven hub adapted to be connected to a rotatable driven element;
a coupling/decoupling arrangement that allows the hydraulic drive to be operated in an engaged mode where the drive shaft is coupled to the driven hub in a direct drive arrangement and a disengaged mode where the drive shaft is decoupled from the driven hub, wherein when the hydraulic drive is operated in the engaged mode torque from the drive shaft is transferred to the driven hub causing the driven hub to rotate relative to the stationary housing, and wherein when the hydraulic drive is operated in the disengaged mode the driven hub can free wheel relative to the drive shaft;
a bearing between the driven hub and the stationary housing for allowing the driven hub to rotate relative to the stationary housing about an axis of rotation defined by the bearing;
a brake including a brake pack having first brake pads mounted to the stationary housing and second brake pads carried by the driven hub, the first and second brake pads being interleaved relative to one another;
a piston; and
a spring for actuating the brake by applying a braking force through the piston to the brake pack to compress the first and second brake pads together such that relative rotation between the driven hub and the stationary housing is resisted by friction between the first and second brake pads, and wherein the brake is released by applying a brake release hydraulic pressure to the piston to generate a brake release force that opposes the braking force;
wherein the piston has a first axial side positioned opposite from a second axial side, wherein the spring is positioned and the coupler are positioned at the first axial side of the piston, wherein a brake release chamber is positioned at the second axial side of the piston, wherein the brake release hydraulic pressure is applied to the brake release chamber to generate the brake release force, wherein the brake release force compresses the spring between the piston and the coupler, wherein the coupler includes a first axial side and an opposite second axial side, wherein the second axial side of the coupler faces the first axial side of the piston, wherein a de-coupling chamber is defined at the first axial side of the coupler for receiving a de-coupling hydraulic pressure used to move the coupler along the axis from the engaged position to the disengaged position, and wherein the stationary housing includes a positive stop that stops axial movement of the coupler when the coupler reaches the disengaged position.

24. A hydraulic drive comprising:
a stationary housing defining a shaft passage;
a main drive shaft that extends through the shaft passage of the stationary housing;
a valve drive shaft coupled to the main drive shaft in a torque transmitting relationship;
a hydraulic motor for rotating the valve drive shaft, the valve drive shaft transferring torque to the main drive shaft such that the main drive shaft rotates relative to the stationary housing, the hydraulic motor including a motor housing assembly that is mounted to the stationary housing, the stationary housing being fixed relative to the motor housing assembly;
a driven hub mounted over the stationary housing, the driven hub including a plurality of first fastener openings for receiving first fasteners used to connect the driven hub to a wheel;
one or more bearings positioned between the driven hub and the stationary housing to allow the driven hub to rotate relative to the stationary housing about an axis of rotation that extends through the shaft passage of the stationary housing;

a coupling/decoupling arrangement that allows the hydraulic drive to be operated in an engaged mode where the main drive shaft is coupled to the driven hub in a direct drive arrangement and a disengaged mode where the main drive shaft is decoupled from the driven hub, wherein when the hydraulic drive is operated in the engaged mode torque from the main drive shaft is transferred to the driven hub causing the driven hub to rotate relative to the stationary housing, and wherein when the hydraulic drive is operated in the disengaged mode the driven hub can free wheel relative to the main drive shaft; and a brake piston mounted between the driven hub and the coupling/decoupling arrangement and frictionally engaged with the driven hub and the coupling/decoupling arrangement such that the coupling/decoupling arrangement, the driven hub and the brake piston are configured to rotate as a unit when driven by the main drive shaft, the brake piston further including two or more sealing arrangements that remain substantially static as the brake piston rotates with the driven hub and the coupling/decoupling arrangement.

25. The hydraulic drive of claim 24, wherein the stationary housing includes a mounting flange that projects radially outwardly from a main body of the stationary housing, the mounting flange defining a plurality of second fastener openings for receiving second fasteners used to secure the stationary housing to a non-driven/stationary element.

26. The hydraulic drive of claim 25, wherein the driven hub includes a main body and a plurality of tabs that project radially outwardly from the main body, the tabs being circumferentially spaced around the axis of rotation along a perimeter of the main body of the driven hub, the first fastener openings being defined through the tabs.

27. The hydraulic drive of claim 26, wherein the tabs are separated by pockets, and wherein at least some of the pockets align with the second fastener openings to facilitate accessing the second fastener openings.

28. The hydraulic drive of claim 24, wherein the brake piston is configured to actuate a brake assembly having first brake pads mounted to the stationary housing and second brake pads carried by the driven hub such that the second brake pads rotate relative to the first brake pads when the driven hub rotates relative to the stationary housing, the first and second brake pads being interleaved relative to one another.

29. The hydraulic drive of claim 28, further comprising a spring assembly for actuating the brake assembly by applying a braking force through the brake piston to the brake assembly to compress the first and second brake pads together such that relative rotation between the stationary housing and the driven hub is resisted by friction between the first and second brake pads.

30. The hydraulic drive of claim 29, wherein the spring assembly is configured to rotate with the driven hub, the coupling/decoupling arrangement and the brake piston.

31. The hydraulic drive of claim 28, wherein the brake assembly is released by applying hydraulic pressure to the brake piston to generate a brake release force that opposes the braking force, and wherein releasing the brake assembly enables at least a portion of the brake assembly to rotate with the driven hub, the coupling/decoupling arrangement, and the brake piston.

32. The hydraulic drive of claim 28, wherein the coupling/decoupling arrangement is located radially outside of the brake assembly.

33. A hydraulic drive comprising:
a stationary housing;
a drive shaft that extends through the stationary housing;
a hydraulic motor for rotating the drive shaft relative to the stationary housing;
a driven hub mounted over the stationary housing, the driven hub adapted to be connected to a rotatable driven element;
a coupling/decoupling arrangement that allows the hydraulic drive to be operated in an engaged mode where the drive shaft is coupled to the driven hub in a direct drive arrangement and a disengaged mode where the drive shaft is decoupled from the driven hub, wherein when the hydraulic drive is operated in the engaged mode torque from the drive shaft is transferred to the driven hub causing the driven hub to rotate relative to the stationary housing, and wherein when the hydraulic drive is operated in the disengaged mode the driven hub can free wheel relative to the drive shaft;
a bearing between the driven hub and the stationary housing for allowing the driven hub to rotate relative to the stationary housing about an axis of rotation defined by the bearing;
a brake including a brake pack having first brake pads mounted to the stationary housing and second brake pads carried by the driven hub, the first and second brake pads being interleaved relative to one another;
a piston; and
a spring for actuating the brake by applying a braking force through the piston to the brake pack to compress the first and second brake pads together such that relative rotation between the driven hub and the stationary housing is resisted by friction between the first and second brake pads, and wherein the brake is released by applying a brake release hydraulic pressure to the piston to generate a brake release force that opposes the braking force;
wherein the coupling/decoupling arrangement includes a coupler moveable between an engaged position and a disengaged position, wherein when the coupler is in the engaged position the coupler is adapted to transfer torque from the drive shaft to the driven hub such that the hydraulic drive is operable in the engaged mode, wherein when the coupler is in the disengaged position the coupler is adapted to not transfer torque between the drive shaft and the driven hub such that the hydraulic drive is operable in the disengaged mode, wherein a mechanical fastener is positionable in a retaining position where the mechanical fastener retains the coupler in the engaged position, and wherein the spring moves the coupler from the engaged position to the disengaged position when the mechanical fastener is moved from the retaining position.

34. A hydraulic drive comprising:
a stationary housing;
a drive shaft that extends through the stationary housing;
a hydraulic motor for rotating the drive shaft relative to the stationary housing;
a driven hub mounted over the stationary housing, the driven hub adapted to be connected to a rotatable driven element;
a coupling/decoupling arrangement that allows the hydraulic drive to be operated in an engaged mode where the drive shaft is coupled to the driven hub in a direct drive arrangement and a disengaged mode where the drive shaft is decoupled from the driven hub, wherein when the hydraulic drive is operated in the engaged mode torque from the drive shaft is transferred to the driven hub causing the driven hub to rotate relative to the stationary housing, and wherein when the hydraulic drive is operated in the disengaged mode the driven hub can free wheel relative to the drive shaft;

a bearing between the driven hub and the stationary housing for allowing the driven hub to rotate relative to the stationary housing about an axis of rotation defined by the bearing;

a brake including a brake pack having first brake pads mounted to the stationary housing and second brake pads carried by the driven hub, the first and second brake pads being interleaved relative to one another;

a piston; and a spring for actuating the brake by applying a braking force through the piston to the brake pack to compress the first and second brake pads together such that relative rotation between the driven hub and the stationary housing is resisted by friction between the first and second brake pads, and wherein the brake is released by applying a brake release hydraulic pressure to the piston to generate a brake release force that opposes the braking force;

wherein the piston has a first axial side positioned opposite from a second axial side, wherein the spring is positioned and the coupler are positioned at the first axial side of the piston, wherein a brake release chamber is positioned at the second axial side of the piston, wherein the brake release hydraulic pressure is applied to the brake release chamber to generate the brake release force, wherein the brake release force compresses the spring between the piston and the coupler, wherein the coupler includes a first axial side and an opposite second axial side, wherein the second axial side of the coupler faces the first axial side of the piston, wherein a de-coupling chamber is defined at the first axial side of the coupler for receiving a de-coupling hydraulic pressure used to move the coupler along the axis from the engaged position to the disengaged position, and wherein the stationary housing includes a positive stop that stops axial movement of the coupler when the coupler reaches the disengaged position.

* * * * *

UNITED STATES PATENT AND TRADEMARK OFFICE
CERTIFICATE OF CORRECTION

Page 1 of 1

PATENT NO. : 9,551,222 B2
APPLICATION NO. : 13/944465
DATED : January 24, 2017
INVENTOR(S) : Lucas et al.

It is certified that error appears in the above-identified patent and that said Letters Patent is hereby corrected as shown below:

On the Title Page

Item (12) "Lucas" should read -- Lucas, et al. --.

Item (72) Inventor is corrected to read:
-- Jay Paul Lucas, Plymouth, MN;
James Michael LeClair, Jr., Prior Lake, MN --.

Signed and Sealed this
Twenty-sixth Day of November, 2019

Andrei Iancu
*Director of the United States Patent and Trademark Office*